US012803824B2

(12) United States Patent
Jeon et al.

(10) Patent No.: US 12,803,824 B2
(45) Date of Patent: Nov. 17, 2026

(54) ELECTRONIC DEVICE FOR ENCODING IMAGE

(71) Applicant: LG ELECTRONICS INC., Seoul (KR)

(72) Inventors: Byeongmoon Jeon, Seoul (KR); Taewoong Park, Seoul (KR); Seunggyu Lee, Seoul (KR); Hyunjoon Kim, Seoul (KR); Samnyol Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 65 days.

(21) Appl. No.: 18/842,732

(22) PCT Filed: Feb. 22, 2023

(86) PCT No.: PCT/KR2023/002507
§ 371 (c)(1),
(2) Date: Aug. 29, 2024

(87) PCT Pub. No.: WO2023/167461
PCT Pub. Date: Sep. 7, 2023

(65) Prior Publication Data

US 2025/0184161 A1 Jun. 5, 2025

(30) Foreign Application Priority Data

Mar. 2, 2022 (KR) ........................ 10-2022-0026972

(51) Int. Cl.
*H04L 9/38* (2006.01)
*G06F 21/60* (2013.01)
*G06T 3/40* (2006.01)
*H04N 23/75* (2023.01)

(52) U.S. Cl.
CPC .............. *H04L 9/38* (2013.01); *G06F 21/602* (2013.01); *G06T 3/40* (2013.01); *H04N 23/75* (2023.01)

(58) Field of Classification Search
None
See application file for complete search history.

(56) References Cited

U.S. PATENT DOCUMENTS 6,356,296 B1 * 3/2002 Driscoll, Jr. ........... G02B 13/06 396/419
2010/0053350 A1 3/2010 Miyauchi et al.
2016/0127646 A1 * 5/2016 Osborne ............ H04N 23/6812 396/55
2017/0366293 A1 * 12/2017 Bergeron ................. H04K 1/00
2019/0199511 A1 * 6/2019 Kyakuno ................ H04L 9/008

FOREIGN PATENT DOCUMENTS

CN 111738897 A 10/2020
EP 4 462 768 A1 11/2024
KR 10-2021-0151464 A 12/2021

* cited by examiner

*Primary Examiner* — Syed A Roni
(74) *Attorney, Agent, or Firm* — Birch, Stewart, Kolasch & Birch, LLP

(57) ABSTRACT

An electronic device for encoding image information, according to the present specification, comprises: a camera module including at least one lens configured to capture an image; and an optical element movably coupled to a front area of the at least one lens so that an object in the image is unidentifiably encoded.

19 Claims, 18 Drawing Sheets

(a)

(b)

(a)

(b)

(a)

(b)

(a) (b)

(a) (b)

ELECTRONIC DEVICE FOR ENCODING IMAGE

CROSS-REFERENCE TO RELATED APPLICATIONS

This application is the National Phase of PCT International Application No. PCT/KR2023/002507, filed on Feb. 22, 2023, which claims priority under 35 U.S.C. 119(a) to Patent Application No. 10-2022-0026972, filed in the Republic of Korea on Mar. 2, 2022, all of which are hereby expressly incorporated by reference into the present application.

TECHNICAL FIELD

The present disclosure relates to a method of encrypting an image. More particularly, the present disclosure relates to a method of encrypting an image in an unidentifiable manner and an electric device capable of performing the method.

BACKGROUND ART

The amendments to the data-related laws, which are now in force in the Republic of Korea, require that personal information be made unidentifiable to protect the personal information while still allowing data to be utilized. These amendments aim to promote the utilization of data as a critical resource in the fourth industry revolution. Specifically, the amendments to the three data-related laws, such as the Personal Information Protection Law, have been in force since August 2020 in the Republic of Korea. These amendments aim to promote the use of data as a critical resource in the fourth industry revolution, particularly in the fields of artificial intelligence, cloud computing, IoT, and the like.

The essential provisions of the amendments to the three data-related laws, such as the Personal Information Protection Law, stipulate that the utilization of information be permitted without the owner's consent when personal information is made unidentifiable. These essential provisions aim to protect the personal information while utilizing data. Standards for making personal information unidentifiable have also been established in the U.S.A. and the EU, and the corresponding personal information protection laws are currently enforced.

Regarding a method of rendering this personal information as unidentifiable information, a reception electronic device that receives an image may acquire an original image and then may also encrypt the original image using software. However, when the reception electronic device performs encryption, there arises a problem in that personal information contained in the original image remains vulnerable to hacking risks at the terminal level.

Data associated with personal information may also be utilized as meaningful Big Data through a deep learning model in a shared environment. In association with this, there arises a problem in that the risk of privacy data leakage is present while data associated with personal information is processed for training through the deep learning model in the shared environment.

In association with this, when always exposed to a camera, customers (users) feel psychologically uncomfortable and protect their privacy by actions like covering a camera lens with a mechanical cover. However, these actions may cause the problem of inconvenience. Privacy protection measures that apply to primary PC cameras, monitor cameras, and webcam products, which are available on the market, are merely passive and aimed at alleviating the user's psychological discomfort. These measures include using a mechanical shutter and covering the camera with its cover.

In addition, covering the camera with its cover can protect privacy as constant surveillance and monitoring are fundamental to providing AI functions and services. The legal regulations are strictly enforced regarding unidentifiable personal information when implementing the AI functions. Therefore, the above-mentioned technique of covering the lens of the camera is not fundamental to protecting privacy.

In addition, with advancements in the fourth industry revolution, there arises a problem that more images containing personal information, which are captured without the person's awareness, may be increasingly utilized as Big Data. In addition, the technology according to the present disclosure is important because companies with technologies that render these images unidentifiable may have a competitive advantage. Furthermore, there is a demand for technologies that can prevent the increasingly frequent hacking of IoT devices.

DISCLOSURE OF INVENTION

Technical Problem

Objects of the present disclosure are to address the above-mentioned problems and other problems. More specifically, one object of the present disclosure is to provide a method of encrypting an image in an unidentifiable manner and an electronic device and an image transmission and reception system that are capable of performing the method.

Another object of the present disclosure is to blur an image using an added optical element and thus to keep a personal image unidentifiable even if utilized for deep learning and similar applications or if hacked.

A further object of the present disclosure is to provide an image having completely the same quality as an image captured by a general camera by switching off and thus removing an added optical element when a unique function of a camera, such as video chatting or remote monitoring, is needed.

Another object of the present disclosure is to output an image that is optically processed in an unidentifiable manner at the camera level so that the image remains unidentifiable even if hacked or if utilized as Big Data for artificial intelligence learning data and similar applications.

Still another object of the present disclosure is to effectively deal with two situations. One situation is when a normal image is needed for video chatting, remote monitoring, or the like. The other situation is when an image processed in an unidentifiable manner is needed because artificial intelligence operates in a general situation.

Yet another object of the present disclosure is to propose a differentiated and competitive technology that is capable of dealing with an environment where hacking of IoT devices is also continuously increasing and, if necessary, of also performing the camera function of a general webcam.

Solution to Problem

In order to accomplish the above-mentioned objects and other objects, according to the present disclosure, there is provided an electronic device that encrypts image information, the electronic device including: a camera module including at least one lens configured to capture an image; and an optical element coupled to be movable in an area in front of the at least one lens in such a manner that an object within the image is encrypted in an unidentifiable manner.

According to an embodiment, in the electronic device, the camera module may include a plurality of lenses; an image sensor arranged to be separated from a first lens arranged rearmost among the plurality of lenses, and configured to convert an analog signal, associated with the image acquired through the plurality of lenses, into a digital signal; and the optical element arranged in front of a second lens arranged frontmost among the plurality of lenses. In the electronic device, the optical element may be arranged in an exposure area of an iris adjusting an image capture area in such a manner as to adjust an amount of light to be introduced into the plurality of lenses.

According to an embodiment, the electronic device may further include an actuator configured to move the optical element relative to the lens. In the electronic device, the actuator rotationally may move the optical element by a predetermined angle, thereby changing a format in which the image is encrypted.

According to an embodiment, in the electronic device, the actuator may arrange the optical element into the image capture area, thereby encrypting the image. In the electronic device, the actuator may move the optical element out of the image capture area, thereby enabling the image to be captured without going through encryption.

According to an embodiment, in the electronic device, one surface of the optical element facing the second lens may be formed in the shape of a parabola along the one axial direction and the other axial direction perpendicular to the one axial direction. In the electronic device, a distance between one surface of the optical element and the second lens may be reduced from a first distance at a first end of the image capture area to a second distance at a second end thereof, thereby encrypting the image.

According to an embodiment, the electronic device may further include a processor configured to control a format in which the image is encrypted, by controlling the actuator. In the electronic device, the processor may control the format in which the image is encrypted, by enabling the actuator to rotationally move the optical element by a predetermined angle. In the electronic device, the distance between one surface of the optical element and the second lens may be formed to be changed, by the rotational movement, from a third distance at the first end of the image capture area to a fourth distance at the second area thereof along the one axial direction. In the electronic device, the third distance may be different from the first distance, and the fourth distance may be different from the second distance.

According to an embodiment, in the electronic device, the first distance at the first end of the image capture area is reduced to the second distance at the second end thereof, the image may be encrypted in a first encryption format. In the electronic device, in a case where the optical element is rotationally moved by 90 degrees by the actuator, the first distance at the first end of the image capture area may be reduced to the second distance at the second end thereof along the other axial direction perpendicular to the one axial direction, thereby encrypting the image in a second encryption format. In the electronic device, in a case where the optical element is rotationally moved by 180 degrees by the actuator, the second distance at the second end of the image capture area may be increased to the first distance at the first end thereof along the one axial direction, thereby encrypting the image in a third encryption format.

According to an embodiment, the electronic device may further include a memory configured in such a manner that encryption keys formed as results of the rotational movements of the optical element by predetermined angles are stored therein. In the electronic device, the encrypted image and the encryption keys may be stored in the memory or a separate server.

According to an embodiment, in the electronic device, the processor may determine whether the authority to access the encrypted image is retained. In the electronic device, when the authority is determined to be retained, the processor may acquire from the memory an encryption key corresponding to an angle by which the optical element is rotated. In the electronic device, the processor may encrypt the encrypted image on the basis of the acquired encryption key and may display the decrypted image on a display in an identifiable manner.

According to an embodiment, in the electronic device, when the encryption key is determined to be leaked to the outside by the external terminal, or according to a type of the application, the processor may encrypt an image by rotationally moving the optical element by a different angle.

According to an embodiment, in the electronic device, the processor may determine whether or not the authority to access the encrypted image is retained, and, when the authority is determined to be retained, may acquire from the memory a second encryption key corresponding to the different angle. In the electronic device, the processor may decrypt the encrypted image on the basis of the acquired second encryption key and may display the decrypted image on a display in an identifiable manner.

According to an embodiment, in the electronic device, the processor may control the format in which the image is encrypted, by enabling the actuator to move the optical element along the other axial direction. In the electronic device, the distance between one surface of the optical element and the second lens may be formed to be changed, by the movement along the other axial direction, from a fifth distance at the first end of the image capture area to a sixth distance at the second end thereof along the other axial direction. In the electronic device, the fifth distance may be different from the first distance, and the sixth distance may be different from the second distance.

According to an embodiment, in the electronic device, the processor may determine whether or not the image needs to be encrypted, on the basis of a type of application program that is already executed or is being executed. In the electronic device, when the image is determined not to need to be encrypted, the processor may control the actuator to move the optical element out of the image capture area along the other axial direction, in such a manner that the image is not encrypted.

According to an embodiment, in the electronic device, the processor may further encrypt the encrypted image using software on the basis of an encryption code that differs according to the rotational angle of the optical element.

According to an embodiment, the electronic device may further include a communication unit configured to receive from a transmission device an image that results from encrypting a captured image in an unidentifiable manner on the basis of an encryption key. In the electronic device, in a case where the authority to access the encrypted image is retained, the processor may restore the encrypted image to a second image on the basis of the encryption key or the second encryption key, and may further restore the second image to a normal image using software.

According to an embodiment, in the electronic device, the processor may further include an image processing unit configured to restore the encrypted image in a deep learning technique and to output an image resulting from the restoration.

According to an embodiment, in the electronic device, the image processing unit may select a point spread function (PSF) image associated with a PSF that depends on the rotational angle of the optical element, may restore the encrypted image on the basis of an encryption key corresponding to an orientation of the selected PSF image and may output the image resulting from the restoration.

According to an embodiment, in the electronic device, the image processing unit may output the image resulting from the restoration, through deep learning that uses learning data configured as the encrypted image and an original image, the encrypted image being captured through the camera module according to the rotational angle of the optical element.

According to an embodiment, in the electronic device, the image processing unit may include: an input interface configured to receive a plurality of blurred images; a plurality of encoders configured to receive the plurality of blurred images and to output encoded images; a deep learning module configured to include a plurality of deep learning units coupled to the plurality of encoders, respectively; and a plurality of decoders coupled to the plurality of deep learning units, respectively. In the electronic device, the image processing unit may perform control in such a manner that a first image, not divided, among the plurality of blurred images, is input into a first encoder, among the plurality of encoders, and that the image resulting from the restoration is output through a first decoder, among the plurality of decoders.

According to an embodiment, in the electronic device, second to fourth images, among the plurality of blurred images, may be divided images. In the electronic device, the first encoder, among the plurality of encoders, may encode the first image with a second residual image having a lower resolution than the image resulting from the restoration. In the electronic device, the second encoder into which the second image is input may encode the second image with a third residual image having a lower resolution than the second residual image. In the electronic device, the third encoder into which the third image is input may encode the third image with a fourth residual image having a lower resolution than the third residual image.

Advantageous Effects of Invention

A method of encrypting an encrypted image in an unidentifiable manner according to the present disclosure and an electronic device and an image transmission and reception system that perform the method is described as follows.

According to the present disclosure, an image is blurred by switching on and thus adding an optical element, which is a new optical component, to a camera lens. As a result, even if utilized for deep learning or similar applications or if hacked, a personal image can remain unidentifiable.

According to the present disclosure, when a unique function of a camera, such as video chatting or remote monitoring, is needed, an image that has completely the same quality as an image captured by a general camera can be provided by switching off and thus removing the added optical element.

According to the present disclosure, when an image captured by an IoT camera, such as a smart home camera, is hacked or utilized as Big Data for artificial intelligence learning data and similar applications, the image, which is optically processed in an unidentifiable manner at the camera level and thus rendered unidentifiable, is output. Consequently, privacy can be protected fundamentally.

According to the present disclosure, a camera structure and a control method can be provided that are capable of effectively dealing with two situations. One situation is when a normal image is needed for video chatting, remote monitoring, or the like. The other situation is when an image processed in an unidentifiable manner is needed because an artificial intelligence operates in a general situation.

According to the present disclosure, an image encryption method can be provided that uses hardware and/or software encryption techniques. This method is capable of dealing with an environment where hacking of IoT devices is also continuously increasing and, if necessary, performing the camera function of a general webcam as well.

According to the present disclosure, not only the risks, such as hacking, but also the causes of breaches of sensitive privacy, which may occur during a data transmission process or a storage process, can be fundamentally eliminated by performing a subsequent deep learning process using optical encryption and an encrypted image.

According to the present disclosure, because a mathematical encryption key for an optically encrypted image is provided, it is also possible that the optically encrypted image is output as an original image, resulting from decryption, in a reception device when necessary.

According to the present disclosure, not only the risks, such as hacking, but also the causes of breaches of sensitive privacy, which may occur during a data transmission process or a storage process, can be fundamentally eliminated by performing a subsequent deep learning process using optical encryption and an encrypted image.

According to the present disclosure, when performing a function such as video chatting or remote monitoring through a switching technique such as the movement or rotation of an encryption optical element, a captured image can be provided in real time with completely the same image quality as an image captured by a general camera, without the burden of additional computation.

Further scope of applicability of the present disclosure will become apparent from the following detailed description. It should be understood, however, that the detailed description and specific examples, such as the preferred embodiment of the invention, are given by way of illustration only, since various changes and modifications within the idea and scope of the invention will be apparent to those skilled in the art.

MODE FOR THE INVENTION

Figure 1:
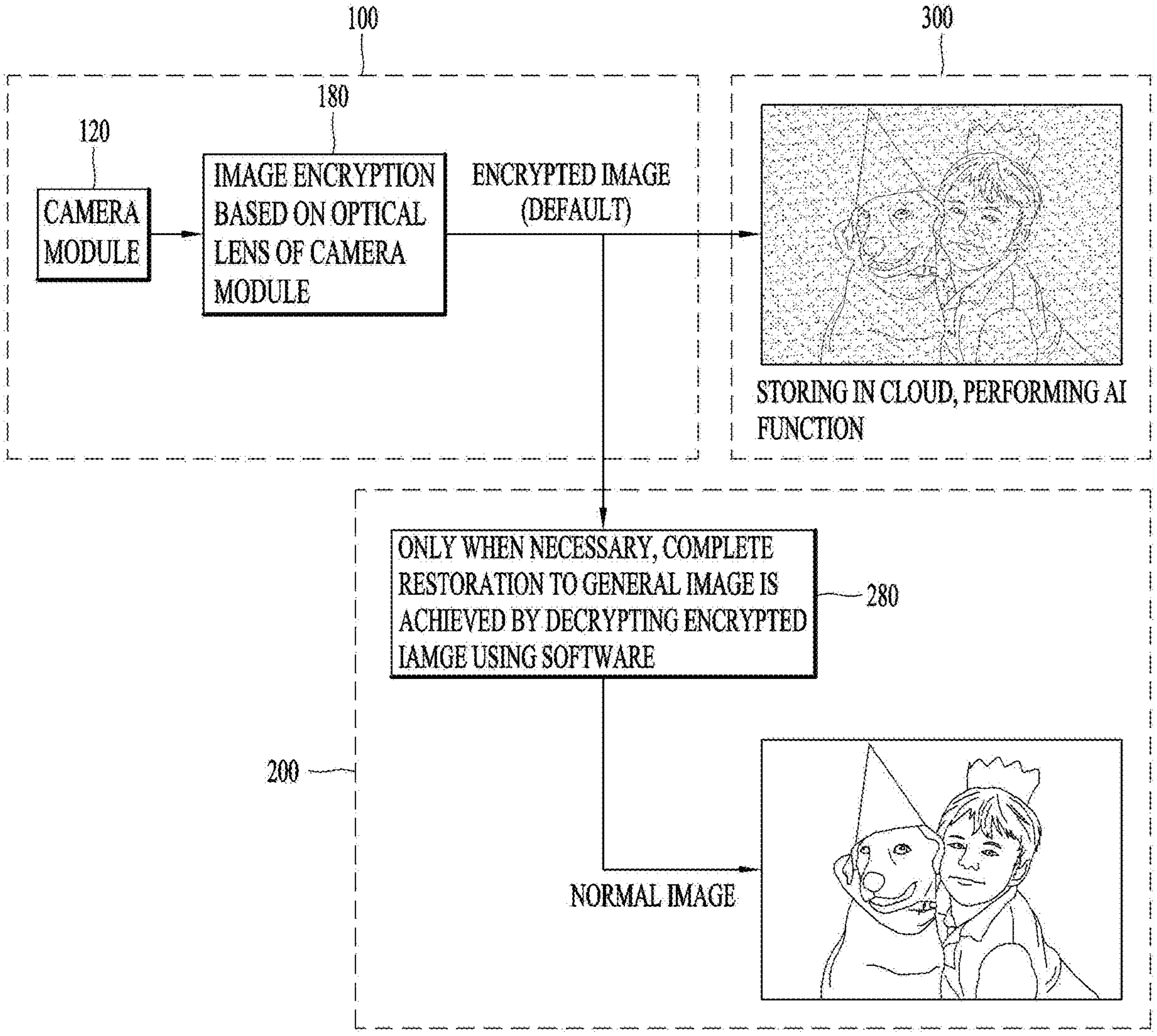
FIG. 1 is a conceptual diagram illustrating an image transmission and reception system that includes electronic devices according to the present disclosure, which transmit or receive an encryptedly captured image.

Description will now be given in detail according to one or more embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms "include" or "has" used herein should be understood that they are intended to indicate the existence of a feature, a number, a step, an element, a component or a combination thereof disclosed in the specification, and it may also be understood that the existence or additional possibility of one or more other features, numbers, steps, elements, components or combinations thereof are not excluded in advance.

Electronic devices presented herein may be implemented using a variety of different types of terminals. Examples of such devices include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, robots, and the like.

An electronic device according to the present disclosure that is capable of transmitting or receiving an encryptedly captured image and an image transmission and reception system that includes the electronic device are described.

The amendments to the data-related laws that require that personal information be made unidentifiable to protect personal information while still allowing data to be utilized passed through the Korean National Assembly and have been in force since August 2020. According to the present disclosure, an image is blurred by switching on and thus adding an optical element, which is a new optical component, to a camera lens. As a result, even if utilized for deep learning and similar applications or if hacked, a personal image remains unidentifiable. However, there is proposed a method in which, when a unique function of a camera, such as video chatting or remote monitoring, is needed, an image that has completely the same quality as an image captured by a general camera can be provided by switching off and thus removing the added optical element.

Figure 2:
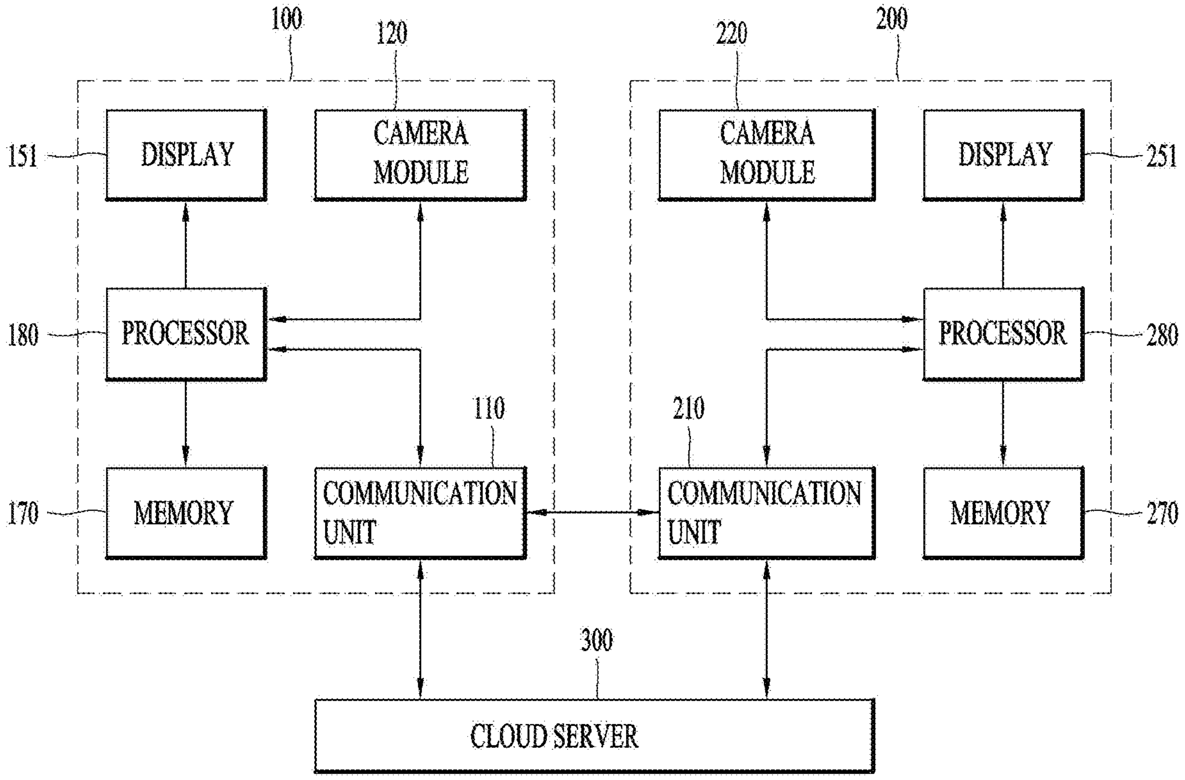
FIG. 2 is a diagram illustrating a configuration of the transmission and reception system in FIG. 1.

In association with this, FIG. 1 is a conceptual diagram illustrating the image transmission and reception system that includes electronic devices according to the present disclosure, which transmit or receive the encryptedly captured image. FIG. 2 is a diagram illustrating a configuration of the transmission and reception system in FIG. 2.

With reference to FIGS. 1 and 2, an electronic device 100 that transmits an encrypted image, derived from a captured image, may be configured in a manner that is enabled to communicate with a second electronic device 200 that is another electronic device. The electronic device 100 may store the encrypted image in a cloud server 300 that corresponds to an internal memory 170 or an external memory. The cloud server 300 may identify and specify persons based on artificial intelligence (AI), using encrypted images received from a plurality of electronic devices, and may derive the results of the analysis. Therefore, the cloud server 300 may be configured to store the encrypted images and analyze these encrypted images based on AI.

In association with a method, according to the present disclosure, of transmitting an encrypted image and restoring the encrypted image, the privacy protection measures for images captured from cameras, which have been researched, developed, and utilized, are described as follows. In almost most existing techniques, a captured image is transmitted, and a server encrypts the captured image and transmits the encrypted image to a reception device.

However, in these techniques, encryption is performed after the server or the reception device acquires an original image. Because of this, a problem arises in that privacy is not protected in a case where hacking occurs at the terminal level or where a server is hacked.

Therefore, in order to fundamentally protect the privacy of an image captured by a camera, according to the present disclosure, an encrypted image may be enabled to be output by adopting an optical encryption technique. In order to implement this feature, according to the present disclosure, a novel optical component (optical element) corresponding to an encryption key is inserted into a lens of an existing camera, thereby obscuring an image and rendering it unidentifiable.

The core of this technology is to additionally design a suitable optical element into a camera, and the designed optical element creates a defocused optical transfer function. This approach enables the acquisition of an unidentifiable image. In a camera system configured in this manner, an image can be restored using a software algorithm that mathematically understands the characteristics of the inserted optical element. Consequently, this camera system may be used like a general 2D camera when video chatting, remote monitoring, or the like is necessary. The optical element corresponding to the encryption key may be configured as an aspherical lens or the like in such a manner as to function as a phase mask for an optical signal.

With reference to FIGS. 1 to 2, the electronic device 100 may be configured to include a communication unit 110, a camera module 120 that corresponds to an input interface, a display 151, a memory 170, and a processor 180. The second electronic device 200, which receives an image transmitted from the electronic device 100, may also be configured to include a communication unit 210, a display 251, a memory 270, and a processor 280. The second electronic device 200 that receives an image may also capture an image and transmit the captured image to the electronic device 100. Accordingly, the second electronic device 200 may also include a camera module.

Figure 3:
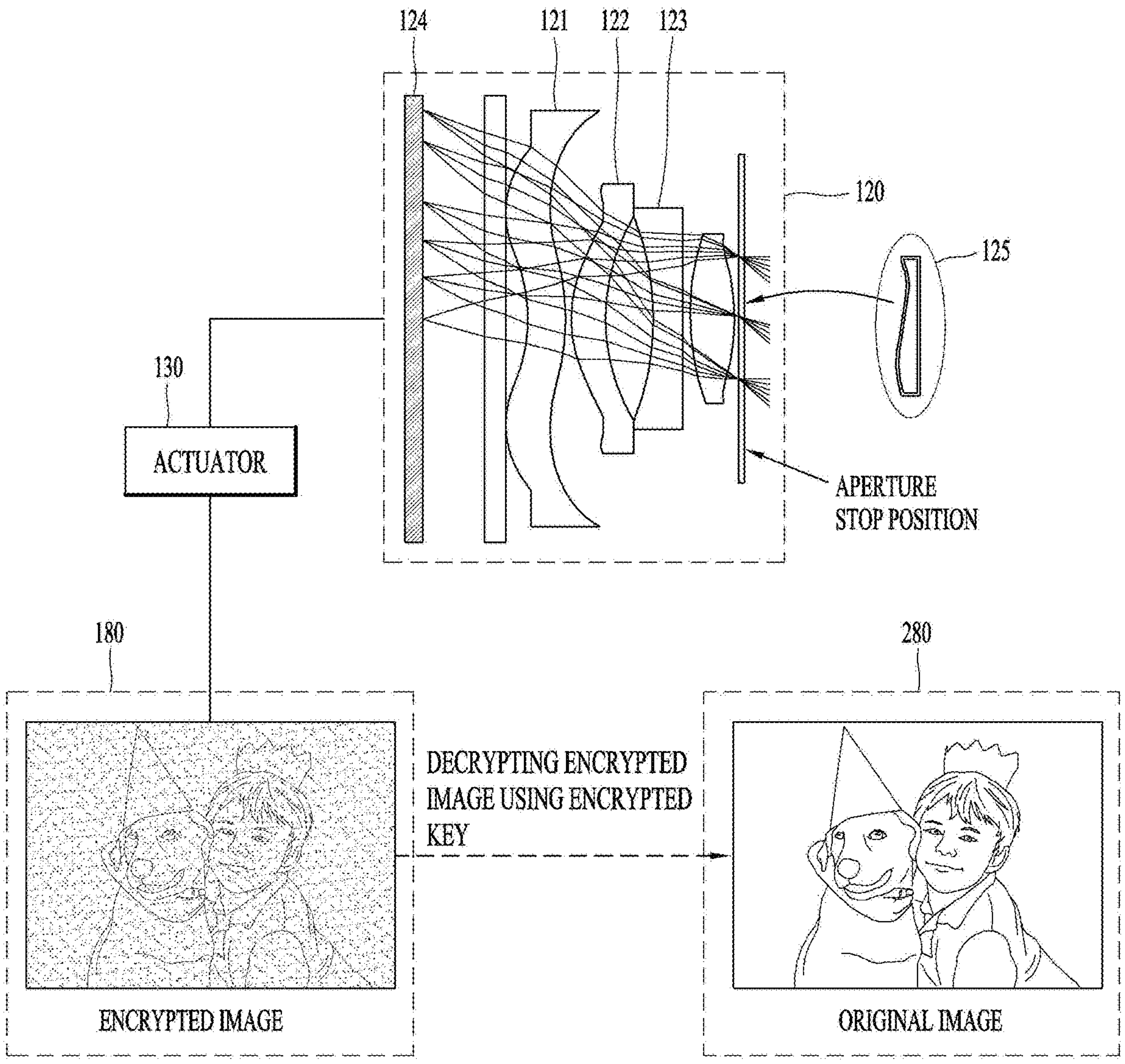
FIG. 3 is a diagram illustrating a camera module of the electronic device according to the present disclosure, which includes an optical element, and a configuration for outputting an encrypted image through the camera module.

The camera module 120 may be configured to capture an image. The camera module 120 may include an optical element inside the camera module 120, the optical element being designed in such a manner as to capture an image as an encrypted image. The optical element, as illustrated in FIG. 3, may be configured as an optical lens that is arranged in front of a plurality of lenses. The display 151 may be operatively coupled to the camera module 120. The display 151 may be configured to display an encrypted image. The electronic device 100 may perform a decryption process that uses an encryption key.

To this end, the processor 180 may be operatively coupled to the camera module 120. The processor 180 may also be operatively coupled to the display 151 and the memory 170. The processor 180 may perform image encryption, which is based on an optical lens of the camera module 120. The processor 180 may control a captured image to be encrypted on the basis of the encryption key in a manner that is unidentifiable with the naked eye.

The processor 180 may perform the decryption process that uses the encryption key. The processor 180 may also be configured to transmit an encrypted image to the second electronic device 200 that is another electronic device. In association with this, the encryption key may be integrated into an application program, but is not limited to this integration. The encryption key may be upgraded within the application program and may also be received from another device. The processor 180 may also be configured to transmit an encrypted image to the cloud server 300.

Accordingly, even in a case where a specific person is included within a captured image, the specific person is encrypted in an unidentifiable manner. Consequently, the protection of the privacy of the specific person is possible. Therefore, an image is provided that is encrypted in an unidentifiable manner. For this reason, the entire system that includes the electronic device 100, which includes the camera module 120, and the second electronic device 200, which receives the encrypted image from the electronic device 100, may be referred to as a privacy camera system. At this point, encrypting an image in an unidentifiable manner may mean that the image is blurred and/or defocused to such an extent that a specific object within the image cannot be identified when viewed externally. However, the encrypting is limited to this blurring or defocusing. Therefore, encrypting an image in an unidentifiable manner may mean a technique in which an image is arbitrarily deformed to such an extent that a specific object within the image cannot be identified.

Only when necessary, the second electronic device 200 may decrypt an encrypted image using software and may restore the encrypted image to an original image as captured. The image resulting from the restoration is a pre-encrypted image, and the specific person within the image resulting from the restoration can be identified. For this reason, the image resulting from the restoration may also be referred to as a normal image.

The privacy camera system according to the present disclosure may be utilized for video meetings, remote monitoring, and the like and may operate in webcam mode. Only when necessary, the second electronic device 200 decrypts an encrypted image using software. Accordingly, the second electronic device 200 may restore the encrypted image to an original image as captured, on the basis of the encryption key and may hold video meetings and perform remote monitoring.

In association with this, if the second electronic device 200 and the cloud server 300 already have the encryption key, only the encrypted image may be transmitted to the second electronic device 200 and the cloud server 300, without the encryption key. In a case where an encryption key for a new image is updated, the updated encryption key may be transmitted to the second electronic device 200 and the cloud server 300.

The camera within the electronic device of the image transmission and reception system according to the present disclosure may include an optical element that changes a captured image in an unidentifiable manner. In association with this, FIG. 3 is a diagram illustrating the camera module of the electronic device according to the present disclosure, which includes the optical element, and a configuration for outputting an encrypted image through the camera module.

With reference to FIG. 3, the camera module 120 may be configured to include a plurality of lenses 121 to 123. The number of the plurality of lenses is not limited to the configuration in FIG. 3, and the plurality of lenses may be configured in combinations of convex lenses and/or concave lenses, depending upon the application. The camera module 120 may further include an optical element 125 that is arranged in front of a plurality of lenses, and is configured to encrypt a captured image in an unidentifiable manner. In association with this, the optical element 125 may be configured as an optical lens that is arranged in front of the plurality of lenses 121 to 123.

The camera module 120 may further include an image sensor 124 configured to sense an analog signal acquired through the optical element 125 and the plurality of lenses 121 to 123 and to convert the acquired analog signals into a digital signal. One of the plurality of lenses 121 to 123 may be embodied as a first lens 121 that is to be arranged adjacent to the image sensor 124. Another lens of the plurality of lenses 121 to 123 may be embodied as a second lens 123 that is to be arranged adjacent to the optical element 125.

A double-step encryption process may be performed. In the double-step encryption process, an image is encrypted through the optical element 125, and in addition, encryption is once more performed on the encrypted image using software. In association with this, the processor 180 may enable the optical element 125 to encrypt an image in an unidentifiable manner. To this end, the processor 180 may control the camera module 120 in such a manner that the optical element 125 encrypts an image in an unidentifiable manner. The processor 180 may once more encrypt the encrypted image using software.

The present disclosure relates to a method in which a captured image is controlled to be encrypted on the basis of the encryption key in a manner that is unidentifiable with the naked eye and in which the encrypted image is transmitted to another electronic device.

According to the present disclosure, the captured image may be controlled to be encrypted in an unidentifiable manner on the basis of the encryption key included in a camera optical system. In association with this, decryption is performed using software only in a case where a normal image is necessary, such as for video chatting or remote monitoring. Data from the captured images may be utilized as Big Data for AI learning or may be employed for the purpose of performing specific AI functions such as face recognition and behavior pattern recognition. In addition, in the case of transmission to or storage in the cloud, restoration to a normal image is not performed, and an image, captured by a camera in a way that is encrypted in an unidentifiable manner, may be utilized as it is. Accordingly, a method, according to the present disclosure, of encrypting an image primarily features the fundamental protection of privacy.

Configuring an encryption key on the basis of a point spread function (PSF) and a modulation transfer function (MTF), which are changed by the optical element 125, and performing encryption based on associated parameters are the primary features. In addition, a method of performing decryption on the basis of an encryption key using software is the primary feature.

As described above, the method, according to the present disclosure, of encrypting an image may be performed using software and hardware. In association with this use of hardware, it is possible that the image captured by the optical element 125 is deformed (encrypted) in hardware. In association with this, with reference to FIGS. 1 to 3, the processor 180 may configure a decryption key on the basis of the extent to which the image is deformed by the optical element. In addition, the processor 180 may control the communication unit 110 in such a manner as to transmit the encrypted image and the encryption key to the second electronic device 200 that is another electronic device.

The processor 180 may also control the encrypted image to be stored in the cloud server 300. The processor 180 may access the cloud server 300 and may control the encrypted image to be restored to a normal image. The processor 180 may control the encrypted image to be restored to the normal image on the basis of the encryption key. In addition, when the second device is an authenticated electronic device, the processor 280 may control the encrypted image to be restored to the normal image, that is, an original image, on the basis of the encryption key.

In a case where an image is deformed (encrypted) in hardware by the optical element 125 and/or is deformed (encrypted) in software by an encryption module, the encrypted image may be decrypted in software on the basis of the encryption key. In association with this, the processor 280 of the second electronic device that receives the encrypted image may restore the encrypted image to the normal image on the basis of the encryption key.

Therefore, the primary technical features of the method, according to the present disclosure, of encrypting an image and the electronic device performing the method may be summarized as follows, but are not limited to the following summary.

Image data, which is acquired in a blurred (encrypted) manner by the camera according to the present disclosure, may be utilized as Big Data for AI learning. The image data, which is encryptedly acquired by the camera, may be utilized for the purpose of specific AI functions, such as face recognition and behavior pattern recognition. In addition, the primary technical feature of the electronic device is that blurred (encrypted) images are utilized as they are, without being decrypted, when transmitting to or storing in the cloud.

The image data, which is acquired in a blurred (encrypted) manner by the camera according to the present disclosure, may be output as a normal image, recognizable by a person, for video chatting, remote monitoring, or the like. In this case, the primary technical feature of the electronic device is that when a program (such as a chatting program or a remote monitoring program) is executed, the program automatically decrypts and outputs an image in real time using the encryption key.

Therefore, even though a terminal with the camera according to the present disclosure is hacked, leaked image data remains blurred (encrypted). Accordingly, the present disclosure has features designed to prevent any resultant damage from the privacy breaches of each personal image captured by the camera.

Figure 4:
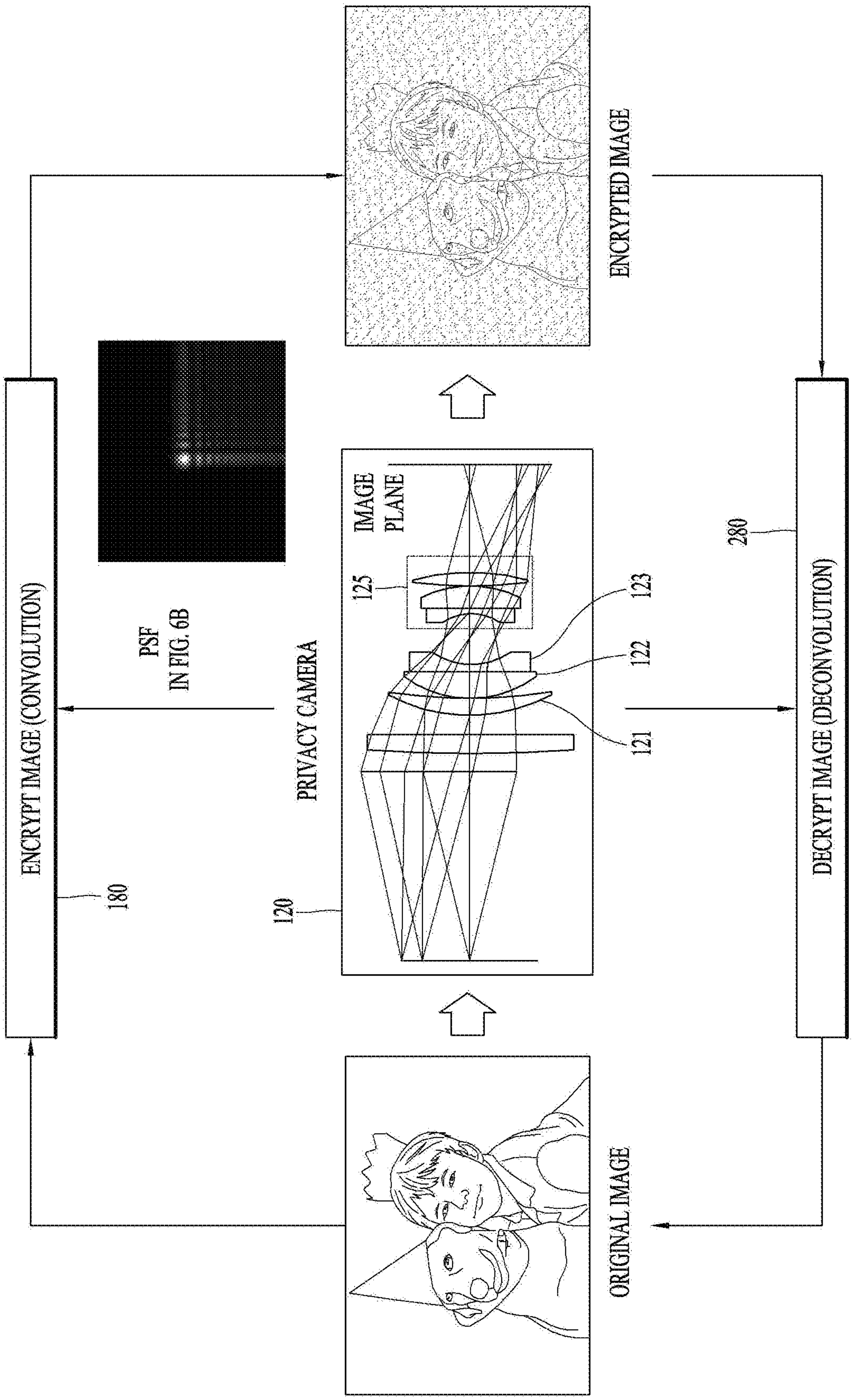
FIG. 4 is a conceptual diagram illustrating a change in a structure of the camera module according to the present disclosure and PSF-based image encryption and decryption processes.

Image optical encryption and decryption methods according to the present disclosure, as described above, may be performed through a change in the structure of the camera module and/or through software-based encryption In association with this, FIG. 4 is a conceptual diagram illustrating the change in the structure of the camera module according to the present disclosure and PSF-based image encryption and decryption processes.

With reference to FIG. 4, an original image may be changed to an encrypted image through the camera module 120. The image passing through the plurality of lenses 121 to 123 within the camera module 120 may be changed to a spread image by the optical element 125. The optical element 125, as illustrated in FIGS. 3 and 4, may be configured with one or more optical elements. The extent to which the image is encrypted may be adjusted by changing the design of one or more optical elements and by optimizing the distances to the plurality of lenses 121 to 123, the relative rotational angle, and similar parameters.

Figure 6A:
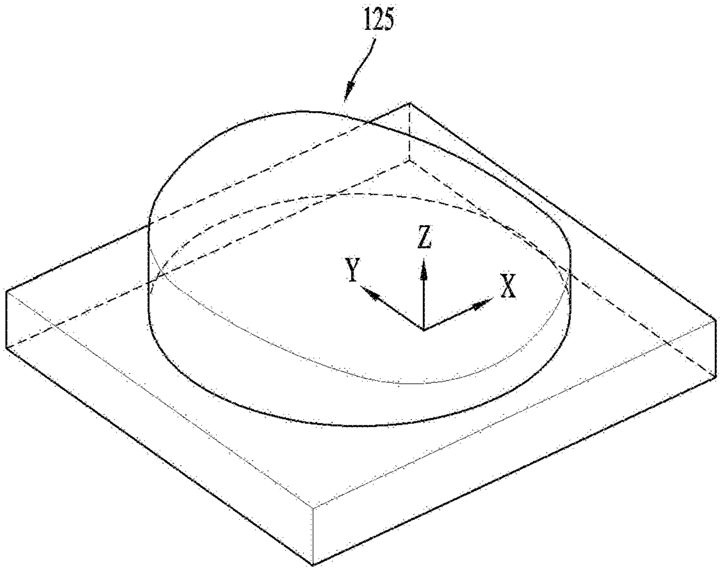
FIG. 6A is a set of views illustrating a 3-dimensional shape of the optical element according to the present disclosure that has the shape of a parabola, and the height of the optical height on a 2-dimensional plane.
Figure 6A:
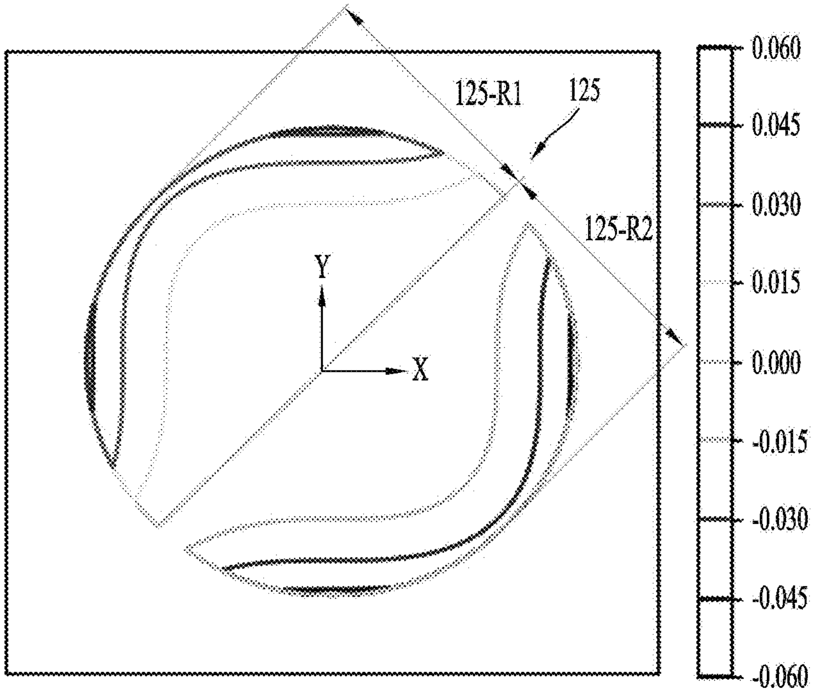
Figure 6B:
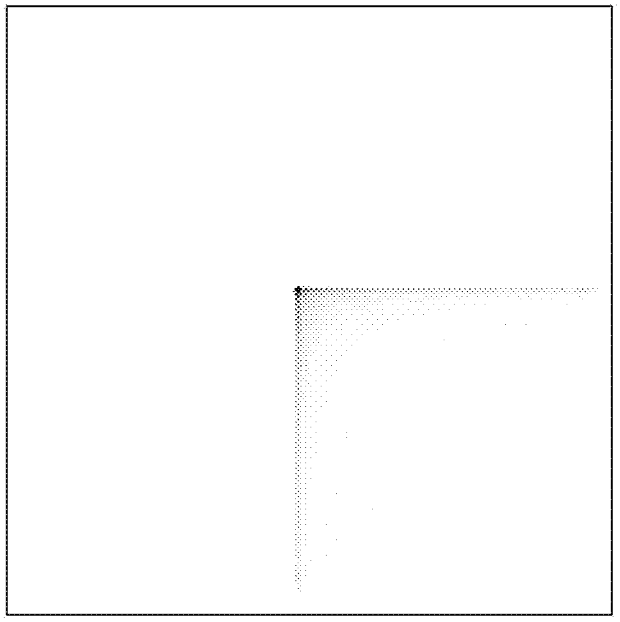
FIG. 6B is a set of views illustrating examples of a PFS image of the camera module in which the optical element in FIG. 6A is arranged.
Figure 6B:
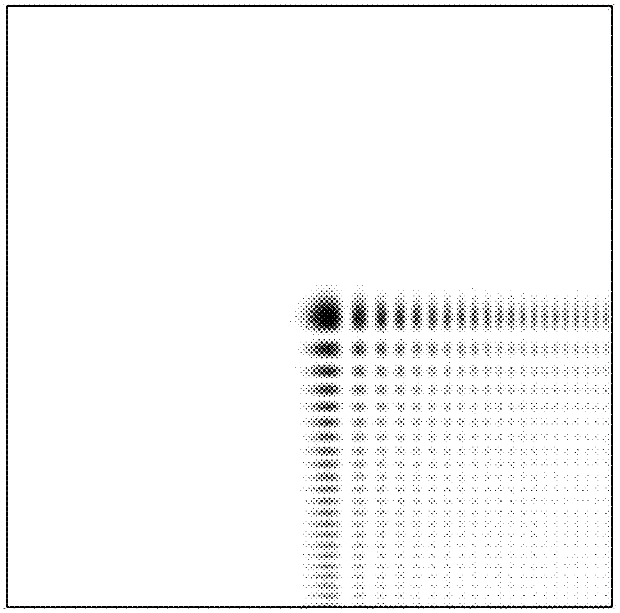

The encrypted image, resulting from the encryption by the optical element 125, may be acquired by the processor 180. The encrypted image, acquired by the processor 180, may be acquired by convolution computation of an original image with a point spread function (PSF), which is illustrated in FIG. 6B. Therefore, the encryption key may be formed by the PSF formed by the arrangement structure of the optical element 125.

The encrypted image, resulting from the encryption by the optical element 125, may be restored to an original image using the encryption key or a decryption key corresponding to the encryption key. The encrypted image may be restored to an original image (or a decrypted image with a predetermined range of similarity to the original image) by the processor 280 of another electronic device, which receives the encrypted image, using the encryption key (or the decryption key) formed by the PSF.

The electronic device 100 may be configured to include the camera module 120 and the optical element 124. The camera module 120 may include at least one lens from the lenses 121 to 123. The optical element 125 may be coupled in a manner that is movable in an area in front of at least one lens from the lenses 121 to 123, so that an object within an image is encrypted in an unidentifiable manner. At this point, the structure that enables “movably coupled” may be a structure in which the optical element 125 is coupled in the area in front of at least one lens from the lenses 121 to 123 in a manner that is rotatable on a per-predetermined angle basis. In addition, the structure that enables “movably coupled” may be a structure in which the optical element 125 moves in the area in front of at least one lens from the lenses 121 to 123 along one axial direction, for example, the x-axis direction.

Figure 5A:
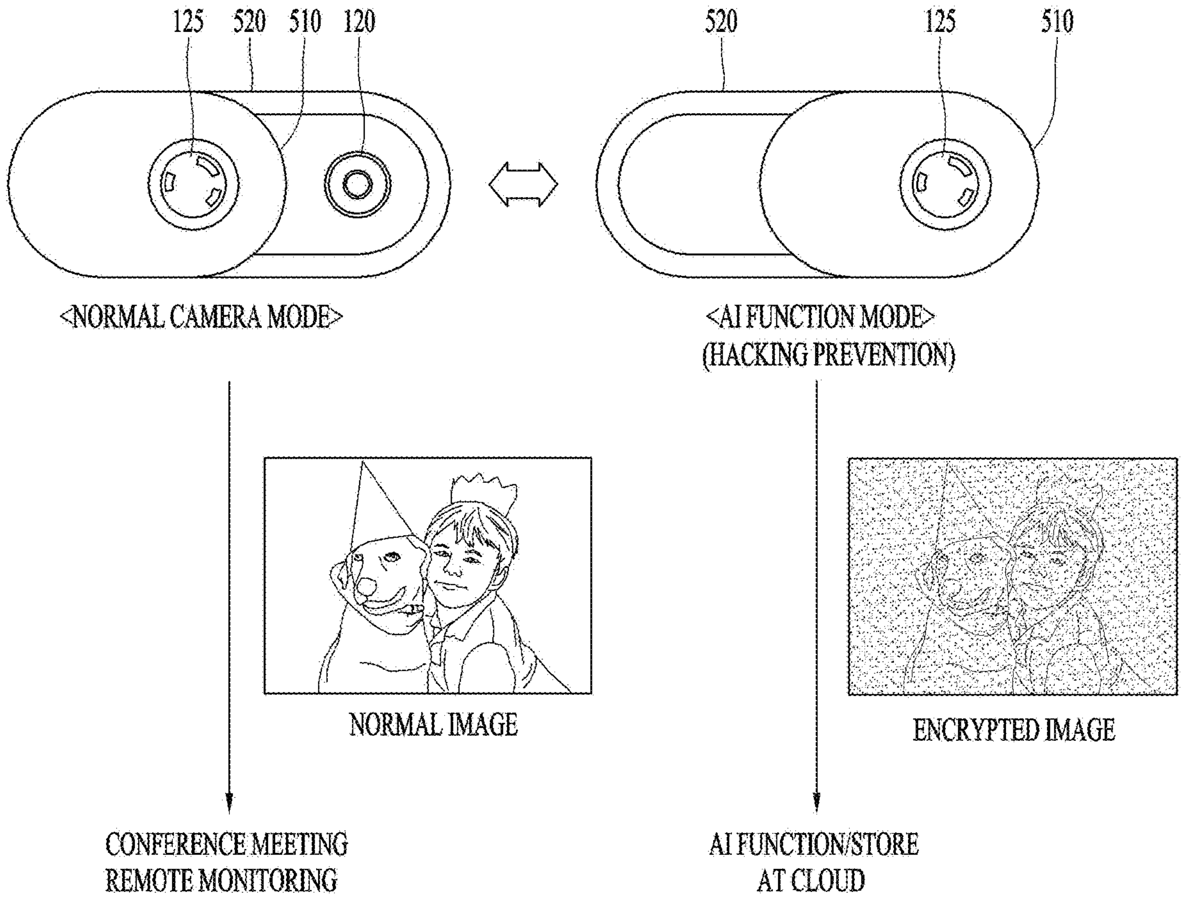
FIG. 5A is a view illustrating a structure in which a moving member, including the optical element, moves in an area in front of the camera module and a use case that employs this structure.
Figure 5B:
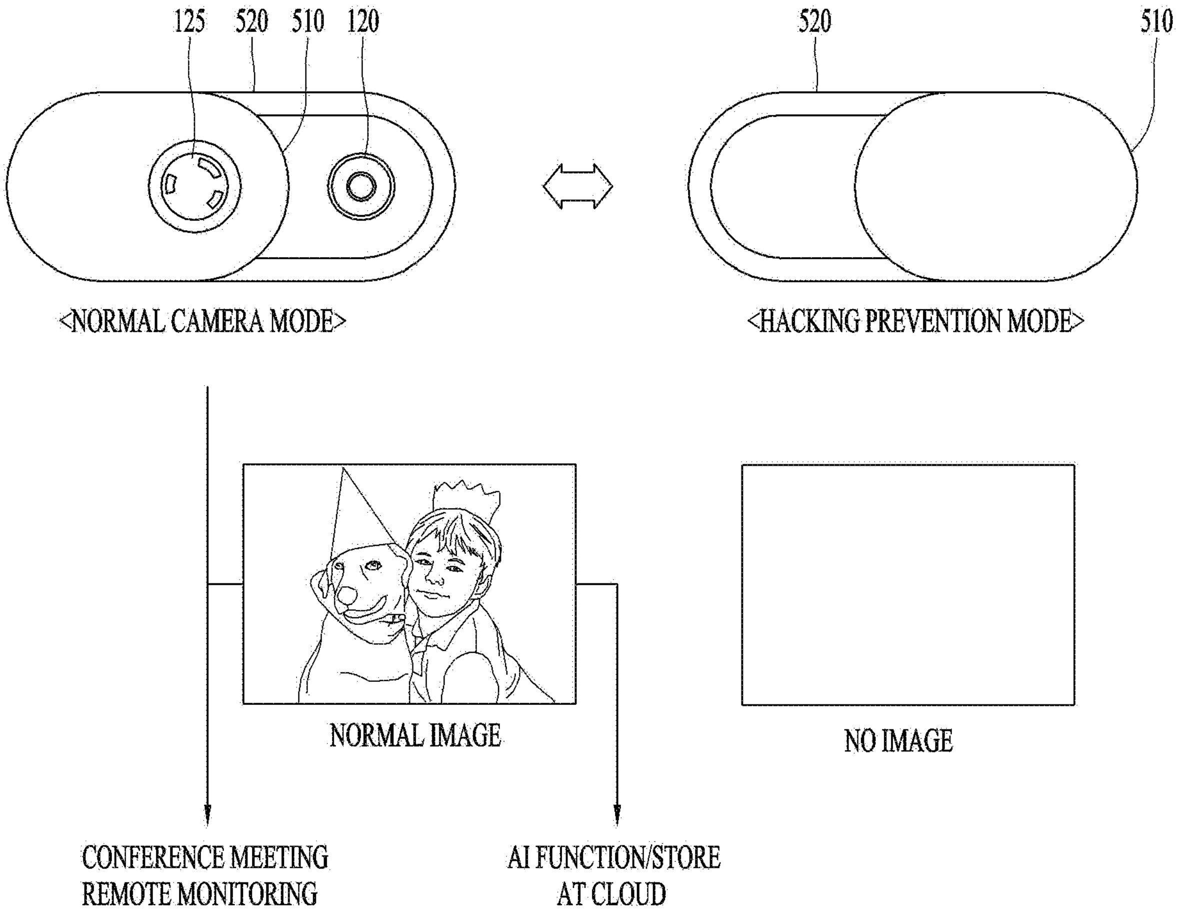
FIG. 5B is a view illustrating a structure in which the moving member moves without the optical member and a use case that employs this structure.

In association with this, FIG. 5A illustrates a structure in which a moving member, including the optical element, moves in an area in front of the camera module and a use case that employs this structure. FIG. 5B illustrates a structure in which the moving member moves without the optical member and a use case that employs this structure.

With reference to FIG. 5A, in a first mode, which is a general camera mode, the optical element 125 coupled to a moving member 510 is arranged at a first position in such a manner as not to overlap with the camera module 120. The moving member 510 may be movably coupled to the stationary member 520. In the first mode, an end portion on one side of the moving member 510 is coupled to one end portion on the internal side of the stationary member 520. In the first mode, an end portion of the other side of the moving member 510 is separated from the other end portion of the internal side of the stationary member 520. Accordingly, in the first mode in which the moving member 510 is arranged at the first position, the moving member 510 is in an open state. An image captured in the first mode is a general image in which an object can be identified.

In the structure in which the optical element 125 is arranged in front of the camera module 120, it is estimated that the mechanical tolerance is more than 10 times the required optical tolerance. However, the structure in which the optical element 125 is arranged in front of the camera module 120 does not require decryption that uses a complex technique. A decrease in performance rarely occurs when implementing a feature-based algorithm that is required for deep learning. In addition, a separate camera for optical encryption does not need to be manufactured. Therefore, it is possible to use an existing camera as is. However, an aperture stop at which the optical element 125 is arranged has to be positioned in front of the second lens 123. Therefore, the electronic device 100 according to the present disclosure that includes the optical element 125 encrypting an image does not need a high-performance chip for decrypting a normal image in real time and possibly provides a solution without a decrease in image quality. A shutter of the camera module 120 may be embodied in a manner that enables automatic switching using a solenoid drive mechanism or the like.

In a second mode, which is an AI functional mode (or a hacking prevention mode), the optical element 125 coupled to the moving member 510 is arranged at a second position in such a manner that overlaps with the camera module 120. In the second mode, an end portion on one side of the moving member 510 is separated from one end portion on the internal side of the stationary member 520. In the second mode, an end portion on the other side of the moving member 510 is coupled to the other end portion on the internal side of the stationary member 520. Accordingly, in the second mode in which the moving member 510 is arranged at the second position, the moving member 510 is in a closed state. An image deformed by the optical element 125 in the second mode is an encrypted image in which an object cannot be identified.

Therefore, even if the electronic device according to the present disclosure that includes the optical element 125 encrypting an image is hacked, it is not possible to identify the object by decrypting the encryptedly stored image, thereby enabling privacy protection. In association with this, when performing an AI function for image encryption, it is possible to render an object within an image unidentifiable.

With reference to FIG. 5B, in the first mode, which is the general camera mode, the moving member 510 is arranged at the first position in such a manner as not to overlap with the camera module 120. In the first mode in which the moving member 510 is arranged at the first position, the moving member 510 is in the open state. An image captured in the first mode is a general image within which an object can be identified.

In the second mode, which is the AI functional mode (or the hacking prevention mode), the moving member 510 is arranged at the second position in such a manner that overlaps with the camera module 120. In the second mode in which the moving member 510 is arranged at the second position, the moving member 510 is in the closed state. In the second mode, the camera module 120 is blocked from view by the moving member 510, and thus an image cannot be acquired through the camera module 120.

Therefore, in a case where an image file, which is captured by the camera module 120 and stored in the electronic device, which does not include the optical element in FIG.

5B, is hacked, there is a risk of a privacy breach. In addition, since the optical element 125 is not included, rendering personal information unidentifiable by performing an AI function does not take place. In association with this, a general image cannot be rendered unidentifiable using software, but the risk of hacking at the terminal level is still present. In addition, when the moving member 510 moves to a position at which the camera module 120 is arranged, although image-capturing is attempted through the camera module 120, no image is acquired.

The camera module 120 according to the present disclosure may be configured to include the plurality of lenses 121 to 123, the image sensor 124, and the optical element 125. The image sensor 124 may be arranged to be separated from the first lens 121, which is arranged rearmost among the plurality of lenses 121 to 123. The image sensor 124 may be configured to convert an analog signal, associated with an image acquired through the plurality of lenses 121 to 123, into a digital signal.

The optical element 125 may be arranged in front of the second lens 123 arranged frontmost among the plurality of lenses 121 to 123. The optical element 125 may be arranged in an exposure area of an iris, which adjusts an image capture area in such a manner as to adjust an amount of light to be introduced into the plurality of lenses 121 to 123.

The electronic device according to the present disclosure that encrypts image information may encrypt an image in different techniques by rotating the optical element 125 arranged in the area in front of the lenses 121 to 123 or moving the optical element 125 along one axial direction. In association with this, the electronic device 100 may further include an actuator 130 that moves the optical element 125 relative to the lenses 121 and 123. The actuator 130 may be embodied as a monitor, but is not limited thereto.

The actuator 130 rotationally moves the optical element 125 by a predetermined angle, thereby changing a format in which the image is encrypted. As an example, the actuator 130 may control the optical element 125 in such a manner as to encrypt the image, by rotationally moving the optical element 125 by 30 degrees or 45 degrees. The actuator 130 may control the optical element 125 in such a manner as to encrypt the image, by 15 degrees, 30 degrees, 45 degrees, 60 degrees, 90 degrees, or 120 degrees.

With reference to FIGS. 3 to 5A, the actuator 130 may control the optical element 125 in such a manner as to be arranged within or out of the image capture area. Accordingly, the actuator 130 may enable the image to be captured, by arranging the optical element 125 into the image capture area. In addition, the actuator 130 may enable an image to be captured, without going through encryption, by moving the optical element 125 out of the optical element 125.

The optical element according to the present disclosure may be formed in the shape of a parabola. In association with this, FIG. 6A illustrates a 3-dimensional shape of the optical element according to the present disclosure that has the shape of a parabola, and the height of the optical height on a 2-dimensional plane. FIG. 6A illustrates an example of a PSF image of the camera module in which the optical element in FIG. 6A is arranged.

(a) of FIG. 6A illustrates the 3-dimensional shape of the optical element according to the present disclosure that has the shape of a parabola. (b) of FIG. 6A illustrates the height of the optical element in (a) of FIG. 6A on the 2-dimensional plane. With reference to (b) of FIG. 6A, the optical element 125 may be formed in such a manner that an upper area 125-R1 thereof has a greater height than a lower area 125-R2 thereof with respect to a predetermined angle.

With reference to FIG. 6A, a height z of the optical element of 125, which satisfies $z=\alpha x^3+\beta y^3$, may be formed in the shape of a parabola. The variable n may be an integer that is equal to or greater than 1. α and β are proportional constants and may be set to range from 0.01 to 0.5. In association with this, when α and β are set to a value that is lower than 0.01, as illustrated in FIG. 5A, a blurring effect is reduced to a threshold level or lower, thereby making an encryption effect negligible. In contrast, when α and β are set to a value that is equal to or higher than 0.5, it may be difficult to machine the optical element, or image restoration may be difficult.

(a) of FIG. 6B illustrates an example of a PSF image of the camera module in which the optical element as in FIG. 6A is arranged. (b) of FIG. 6B provides an enlarged illustration of the PSF image as in (a) of FIG. 6B. With reference to FIG. 6B, the point spread function refers to an image of a point source object present at an infinite distance in theory, which is formed on an image sensor of the camera. The asymmetrically spread PSF as in FIG. 6B may be generated using an encryption lens such as the optical element 125 in FIG. 6A. Unlike a normal camera image, an image encrypted in a blurred manner as in FIG. 5A may be acquired using the asymmetrically spread PSF.

Figure 7A:
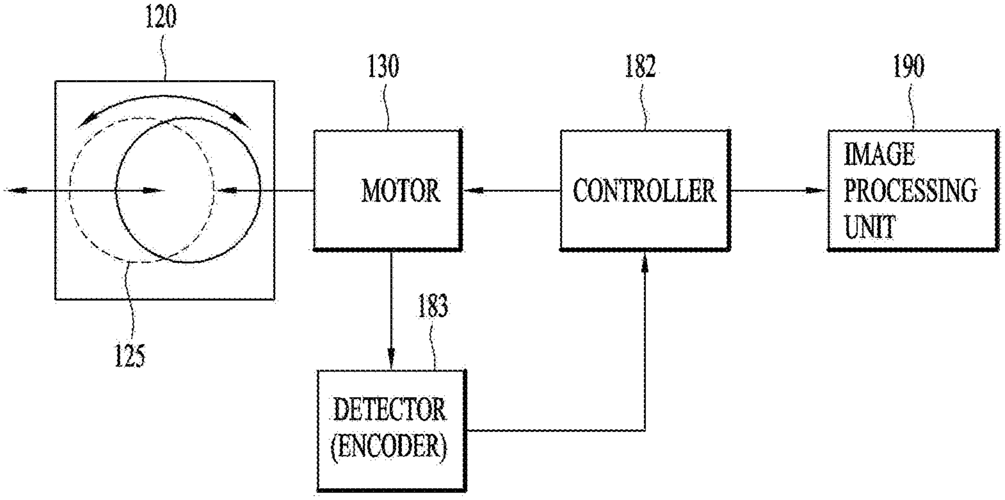
FIG. 7A is a diagram illustrating a configuration of the electronic device according to the present disclosure that is capable of deforming the PSF image by rotating the optical element.
Figure 7B:
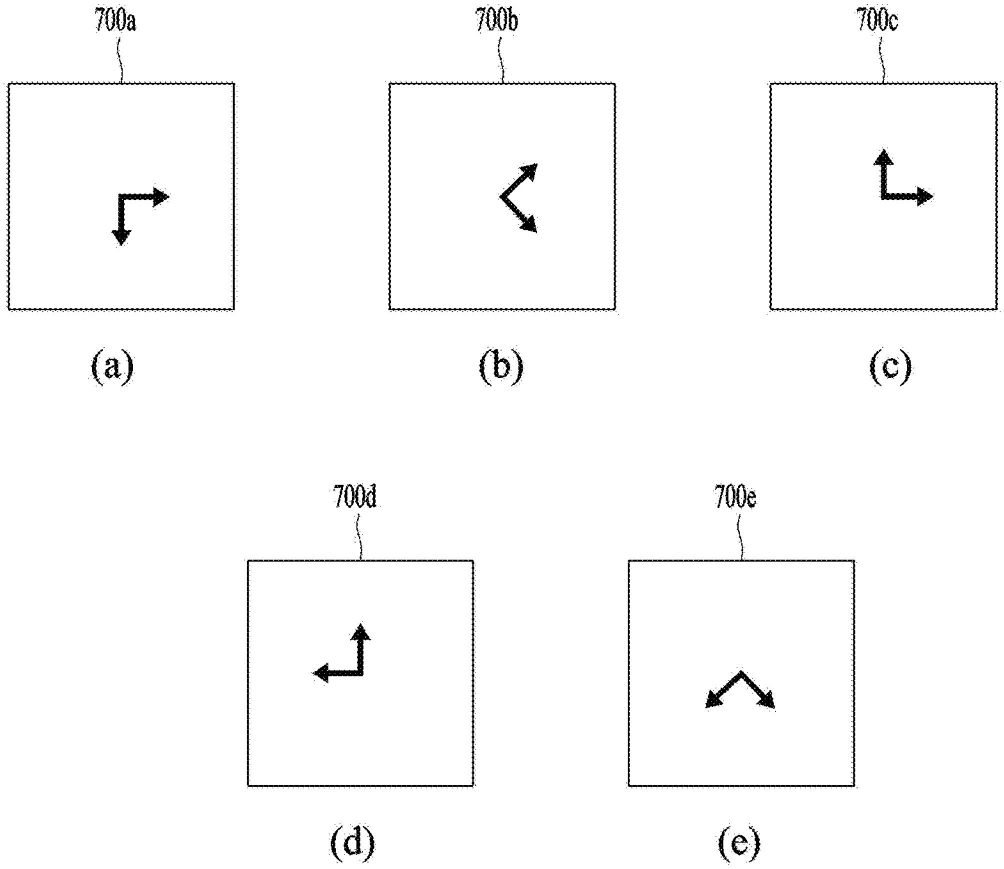
FIG. 7B is a set of diagrams illustrating examples of directions in which specific portions of the PSF images that can be deformed by rotating the optical element in FIG. 7A are indicated.

In the electronic device according to the present disclosure that encrypts an image, the PSF image may be variably deformed by rotating the optical element. In association with this, FIG. 7A illustrates a configuration of the electronic device according to the present disclosure that is capable of deforming the PSF image by rotating the optical element. FIG. 7B illustrates examples of directions in which specific portions of the PSF images that can be deformed by rotating the optical element are indicated.

With reference to FIG. 7A, the electronic device may include the camera module 120, which includes the optical element 125, a motor 130, a controller 182, a detector 183, and an image processing unit 190. The controller 182, the detector 183, and the image processing unit 190 may be included in the processor 180 in FIG. 2, but is not limited to this configuration. The controller 182, the detector 183, and the image processing unit 190 may also be embodied separately from the processor 180.

With reference to FIGS. 2, 3, and 7A, the camera module 120 may be configured to include the plurality of lenses 121 to 123 and the optical element 125. An image may be encrypted in various encryption formats in differently blurred patterns by rotating the optical element 125 relative to the lenses 121 to 123 or rotating the entire camera module 120. As an example, an image may be encrypted in various encryption formats in different blurred patterns by moving the optical element 125 relative to the lenses 121 to 123 along a specific axial direction. The motor 130 may be configured to rotate the optical element 125 or the camera module 120. As another example, the motor 130 may be configured to move the optical element 125.

The controller 182 may control the motor 130 in such a manner that the optical element 125 or the camera module 120 is rotated. The detector 183 may detect a rotational angle of the optical element 125 or the camera module 120 in conjunction with the motor 130 and the controller 182. The detector 183 is configured to encode the rotational angle of the motor 130. For this reason, the detector 183 may also be referred to as an encoder. The image processing unit 190 may be configured to restore the encrypted image on the basis of the rotational angle of the optical element 125 or the camera module 120, in conjunction with the controller 182.

In association with a method of control that varies with the rotational angle, the motor 130, an encoder 182, and the controller 182 may set a posture (angle) of an encryption lens, such as the optical element 125, to an arbitrary direction. The image processing unit 190 may select the PSF image that varies with the posture (angle) of the encryption lens. In association with this, simulation using an optical tool, or the PSF secured by performing image capture at a specific angle in advance may be utilized.

With reference to FIGS. 7A and 7B, comparisons are made among images that result when the encryption lens, such as the optical element 125, is rotated by a predetermined angle. (a) of FIG. 7B illustrates a first orientation 700*a* of the PSF image in a structure in which the optical element is arranged to 0 degrees. In a structure in which the optical element is arranged to 0 degrees, the first orientation 700*a* of the PSF image may be set to 0 degrees/−90 degrees. (b) of FIG. 7B illustrates an orientation 700*b* of the PSF image in a structure in which the optical element is clockwise rotated to a predetermined angle (for example, 30 degrees). In a structure in which the optical element is arranged to a predetermined angle (for example, 30 degrees), the second orientations 700*b* of the PSF image may be set to 30 degrees/−60 degrees.

The PSF image in (c) of FIG. 7B indicates an orientation 700*c* of the PSF image in a structure in which the optical element is arranged to 90 degrees. In the structure in which the optical element is arranged to 90 degrees, an orientation 700*c* of the PSF image may be set to 90 degrees/0 degrees. The PSF image in (d) of FIG. 7B indicates the orientation 700*c* of the PSF image in a structure in which the optical element is arranged to 270 degrees (−90 degrees). In the structure in which the optical element is arranged to 270 degrees (−90 degrees), the orientation 700*c* of the PSF image may be set to −90 degrees/−180 degrees. The PSF image in (e) of FIG. 7B indicates the orientation 700*c* of the PSF image in a structure in which the optical element is arranged to a predetermined angle (for example, −30 degrees). In the structure in which the optical element is arranged to a predetermined angle (for example, −30 degrees). The orientation 700*c* of the PSF image may be set to −30 degrees/−120 degrees.

The encrypted image may be restored using the encryption key (decryption key) that is based on the PSF selected as in FIG. 7B. When restoration is performed through a deep learning method, a model trained in accordance with the PSF may be used.

In the electronic device of the image transmission and reception system according to the present disclosure, a process of encrypting a captured image may be repeatedly performed by adjusting an optical structure and the extent to which a specific object within an image is spread and displayed. In association with this, FIG. 8A is a flowchart illustrating a method of encrypting an image captured in the electronic device of the image transmission and reception system according to the present disclosure.

Figure 8A:
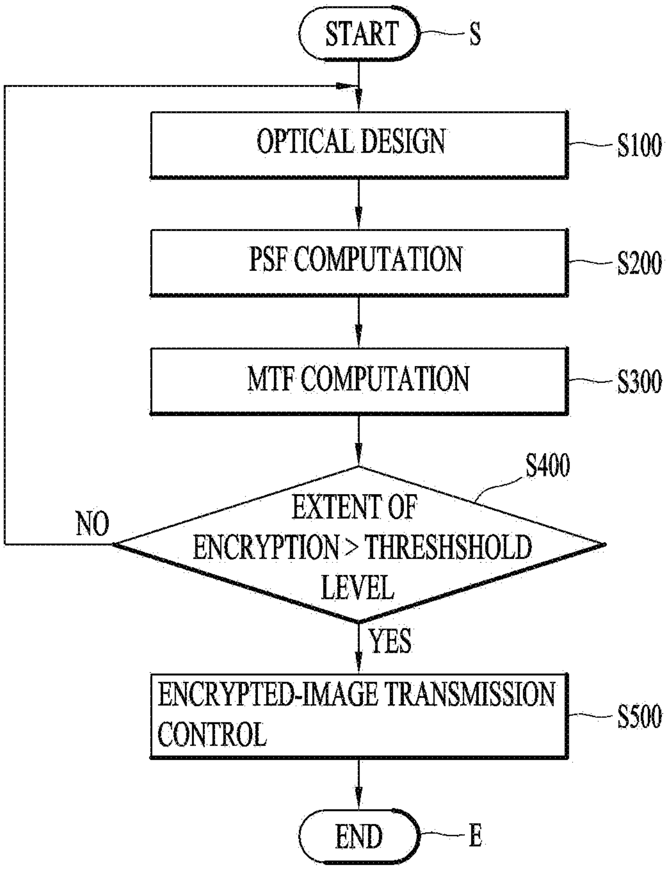
FIG. 8A is a flowchart illustrating a method of encrypting an image captured in the electronic device of the image transmission and reception system according to the present disclosure.

With reference to FIG. 8A, the method of encrypting a captured image may be configured to include an optical design process S100, a point spread function (PSF) computation process S200, a modulation transfer function (MTF) computation process S300, and an encryption extent determination process S400. In addition, the method of encrypting an image may be configured to further include an encrypted-image transmission control process S500. In addition, the method of encrypting an image may further include an encryption key change and non-change determination process S600). Even in the encrypted-image transmission control process S500, when the encryption key is determined to need to be changed, the encryption key may be changed and the encrypted image may be transmitted along with the changed encryption key. Even in the encrypted-image transmission control process S500, when the encryption key is determined to need to be changed, in order to change the encryption key, the optical design process S100 and the process subsequent thereto, or the PSF computation process S200 and the process subsequent thereto, may also be repeated.

With reference to FIGS. 1 to 8A, in the optical design process S100, the optical structure may be designed by determining a distance between the optical element 125 and the plurality of lenses 121 to 124 and the rotational angle of the optical element 125. In the point spread function (PSF) computation process S200, a parameter for the point spread function (PSF) is determined in such a manner that a normal image is encrypted in a manner that is unidentifiable with the naked eye at a threshold level or higher. Specifically, the parameter for the point spread function (PSF) is determined in such a manner that the normal image is encrypted to a threshold or higher at a defocused position relative to the focal point of a pre-encryption normal image in a manner that is unidentifiable with the naked eye. In association with this, the point spread function (PSF) computation process S200 may be repeatedly performed. The parameters for the point spread function (PSF), which are updated through the point spread function (PSF) computation process S200 that is repeatedly performed may be referred to as first, second, third, and so forth up to N-th parameters, respectively.

In the modulation transfer function (MTF) computation process S300, the image encrypted in a spatial domain may be acquired through convolution computation. In association with this, Mathematical Equation 1 mathematically expresses an encryption algorithm and a restoration algorithm.

$$B = S * K \Rightarrow S = B/K \qquad \text{[Mathematical Equation 1]}$$

In Mathematical Equation 1, B depicts an encrypted image, and S is a pre-encryption normal image. K depicts a point spread function (PSF), "*" depicts a convolution operator, and "/" depicts a deconvolution operator. The point spread function (PSF) represents a characteristic of a camera lens output image for an ideal point source in the spatial domain. In association with this, FIGS. 7A and 8A illustrate an example of a PSF pattern associated with optical encryption according to the present disclosure and an example of a PSF pattern that results from defocusing a general camera, respectively.

The modulation transfer function (MTF) may be acquired by Fourier-transforming the point spread function (PSF) into a frequency domain.

In the modulation transfer function (MTF) computation process S300, a parameter associated with the modulation transfer function (MTF) may be computed by Fourier-transforming the encrypted image. In the modulation transfer function (MTF) computation process S300, the parameter associated with the modulation transfer function (MTF) may be computed by Fourier-transforming the encrypted image using the encryption key and/or a PSF parameter corresponding to the encryption key.

Subsequently, in the encryption extent determination process S400, it may be determined, on the basis of the parameter associated with the modulation transfer function (MTF), whether or not the extent to which an image is encrypted satisfies a threshold level. When the extent to which the image is encrypted satisfies the threshold level, the encrypted-image transmission control process S500 may be performed that controls the parameter associated with the MTF and the encrypted image to be transmitted to the second electronic device 200.

In contrast, when the extent to which the image is encrypted is determined not to satisfy the threshold level, the optical design process S100 and the processes subsequent thereto may be repeated, but the method is not limited to this repetition. As another example, when the extent to which the image is encrypted is determined not to satisfy the threshold level, the point spread function (PSF) computation process S200 and the processes subsequent thereto may be repeated without repeating the optical design process S100. Accordingly, even without changing and redesigning hardware, such as the optical structure, the extent to which the image is encrypted may also be changed by reconfiguring the parameter for the PSF.

When the extent to which the image is encrypted is determined not to satisfy the threshold level, the processor 180 acquires an encrypted second image in the spatial domain through the convolution computation in the point spread function (PSF) computation process S200. Through the modulation transfer function (MTF) computation process S300, the processor 180 computes a second parameter associated with the modulation transfer function (MTF) by Fourier-transforming the encrypted second image. Through the encryption extent determination process S400, the processor 180 may determine, on the basis of the computed second parameter, the extent to which the encrypted second image is encrypted. When the extent to which the second image is encrypted satisfies a threshold level, the processor 180 may perform control in such a manner that the second parameter associated with the MTF and the encrypted second image are transmitted to the second electronic device 200.

In the electronic device of the image transmission and reception system according to the present disclosure, a process of decrypting a captured image may be performed on the basis of the optical structure and of the PSF parameter, which results from adjusting the extent to which the specific object within the image are spread, that is, the encryption key. In association with this, FIG. 8B is a flowchart illustrating a method of decrypting an image captured in the electronic device of the image transmission and reception system according to the present disclosure.

Figure 8B:
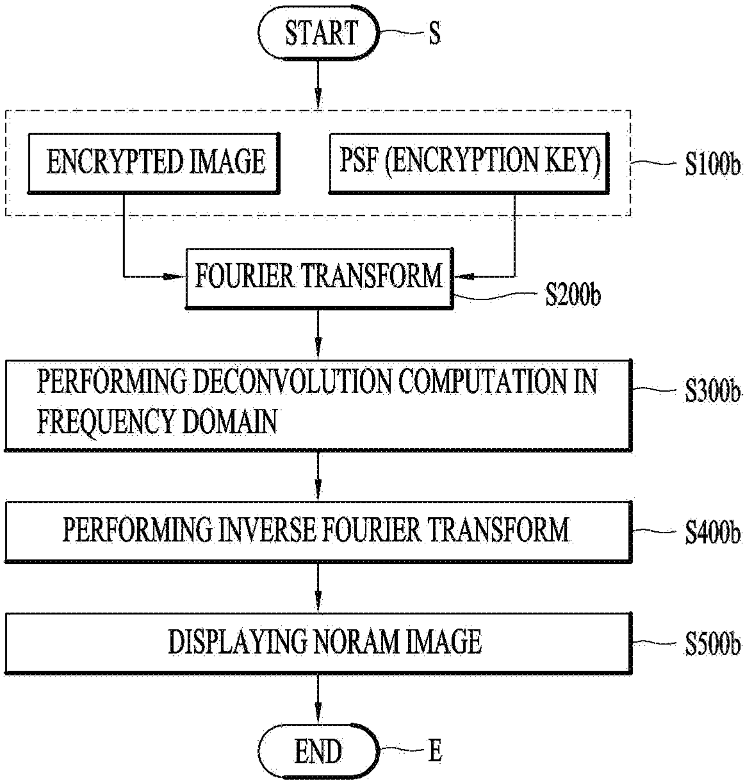
FIG. 8B is a flowchart illustrating a method of decrypting an image captured in the electronic device of the image transmission and reception system according to the present disclosure.

With reference to FIG. 8B, the method of decrypting the encrypted image may be configured to include an encrypted-image reception process S100*b*, a Fourier transform process S200*b*, a deconvolution process S300*b*, an inverse Fourier transform process S400*b*, and a normal image display process S500*b*.

With reference to FIGS. 1 to 8B, the method of decrypting the encrypted image may be regarded as being performed in the second electronic device 200 that receives the encrypted image. However, the method is not limited to this configuration, and an application in which the electronic device 100 and the second electronic device 200 perform bidirectional image transmission may be considered. Therefore, it may also be assumed that both the electronic device 100 and the second electronic device 200 encrypt and transmit an image and receive and decrypt the encrypted image.

In the encrypted-image reception process S100*b*, the encrypted image and the PSF parameter associated with the encrypted image, that is, the encryption key, may be received. In the Fourier transform process S200*b*, the encrypted image may be Fourier-transformed on the basis of the encryption key, that is, the PSF parameter associated with the encrypted image. In the deconvolution process S300*b*, deconvolution computation may be performed on the image that is encrypted in the frequency domain.

In the inverse Fourier transform process S400*b*, the inverse Fourier transform may be performed on an image, resulting from the restoration from the frequency domain through the deconvolution computation, thereby restoring the result of the inverse Fourier transform to a normal image in the spatial domain. In the normal image display process S500*b*, the normal image resulting from the restoration may be controlled to be displayed on a screen of the display.

When Fourier-transforming the PSF corresponding to the encryption key according to the present disclosure, the modulation transfer function (MTF) may be acquired, and the extent to which the image is encrypted, that is, the extent to which the image is unidentifiable, may also be designed based on the MTF. In association with this, FIGS. 9A and 9β are graphs showing an example of a modulation function for a configuration of a general camera and an example of a modulation function for a configuration to which image encryption according to the present disclosure applies, respectively.

Figure 9A:
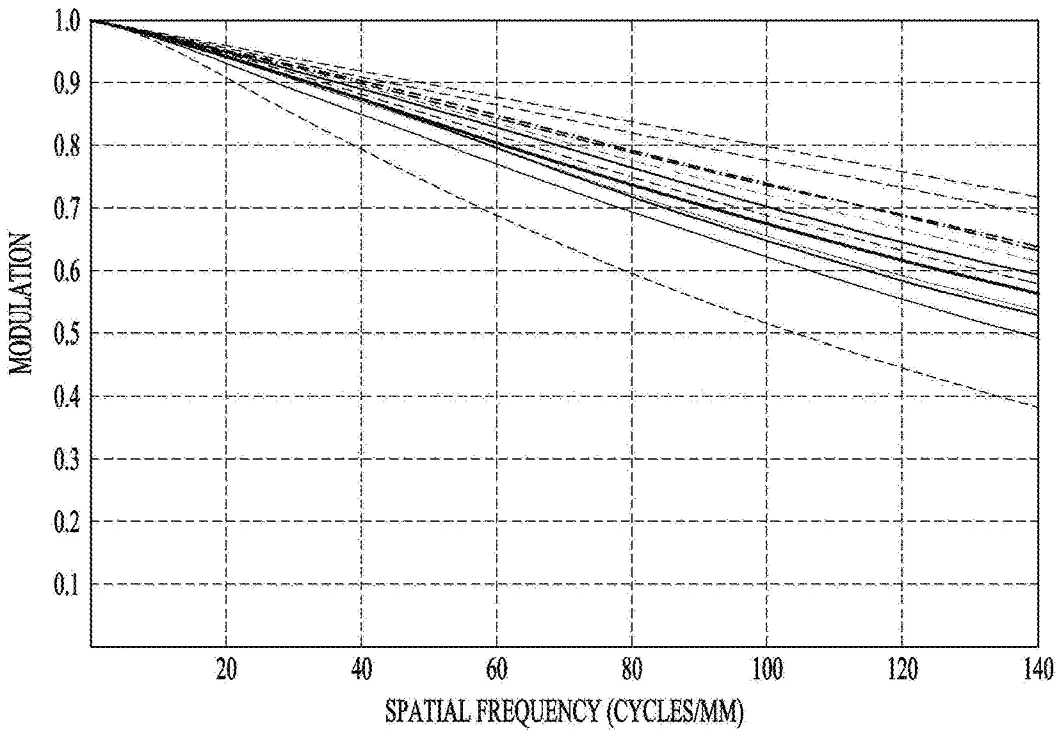
FIGS. 9A and 9B are graphs showing an example of a modulation function for a configuration of a general camera and an example of a modulation function for a configuration to which image encryption according to the present disclosure applies, respectively.

With reference to FIG. 9A, in the configuration of the general camera, as the spatial frequency increases, the modulation of the image, that is, the extent to which the image is encrypted (the extent to which the image is unidentified increases in proportion to the spatial frequency. In association with this, the modulation transfer function (MTF) serves as a performance index indicating the performance of a camera or a lens and corresponds to a performance index that assigns the ability to reproduce a fine portion of a subject, that is, a resolution response.

Figure 9B:
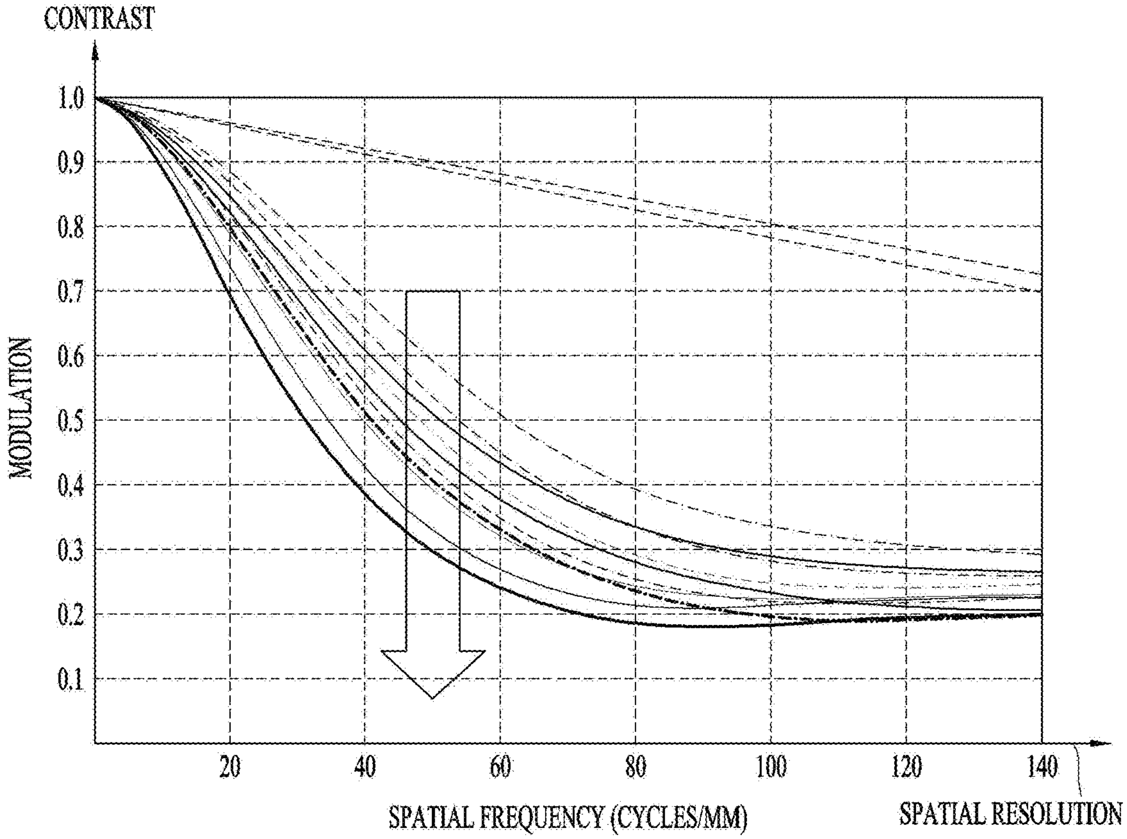

With reference to FIG. 9B, in the configuration to which the image encryption according to the present disclosure applies, as the spatial frequency increases, the modulation of the image, that is, the extent to which the image is encrypted (the extent to which the image is unidentified) increases at a high rate within a predetermined range. In addition, in a predetermined spatial frequency range, a structure in FIG. 9B has a higher non-identification value than a structure in FIG. 9A. The non-identification value is associated with the modulation of the image and the extent to which the image is encrypted (the extent to which the image is unidentified). Therefore, when the extent to which the image is unidentified is tuned starting from the optical design step, the image encryption based on the MTF parameter as in FIG. 9B may be performed. In association with this, the MTF parameter may be a spatial frequency associated with the spatial frequency, but is not limited thereto.

With reference to FIGS. 1 to 9B, the electronic device 100 according to the present disclosure, which includes the optical element and encrypts an image, is described. One surface of the optical element 125 that faces the second lens 123, among the plurality of lenses 121 to 123, may be formed in the shape of a parabola along one axial direction and the other axial direction perpendicular to the one axial direction. In association with this, the optical element 125 may be formed in the shape of a parabola in such a manner that the height z thereof satisfies $z=\alpha x^3+\beta y^3$, but is not limited to this shape. The optical element 125 may be formed in the shape of a parabola in such a manner that the height z thereof satisfies $z=\alpha x^{2n+1}+\beta y^{2n+1}$ where n may be an integer that is equal to or greater than 1, resulting in odd powers. α and β are proportional constants and may be set to range from 0.01 to 0.5. In association with this, when α and β are set to a value that is lower than 0.01, as illustrated in FIG. 5A, the blurring effect is reduced to a threshold level or lower, thereby making the encryption effect negligible. In contrast, when α and β are set to a value that is equal to or greater than 0.5, it may be difficult to machine the optical element, or the image restoration may be difficult.

Figure 10A:
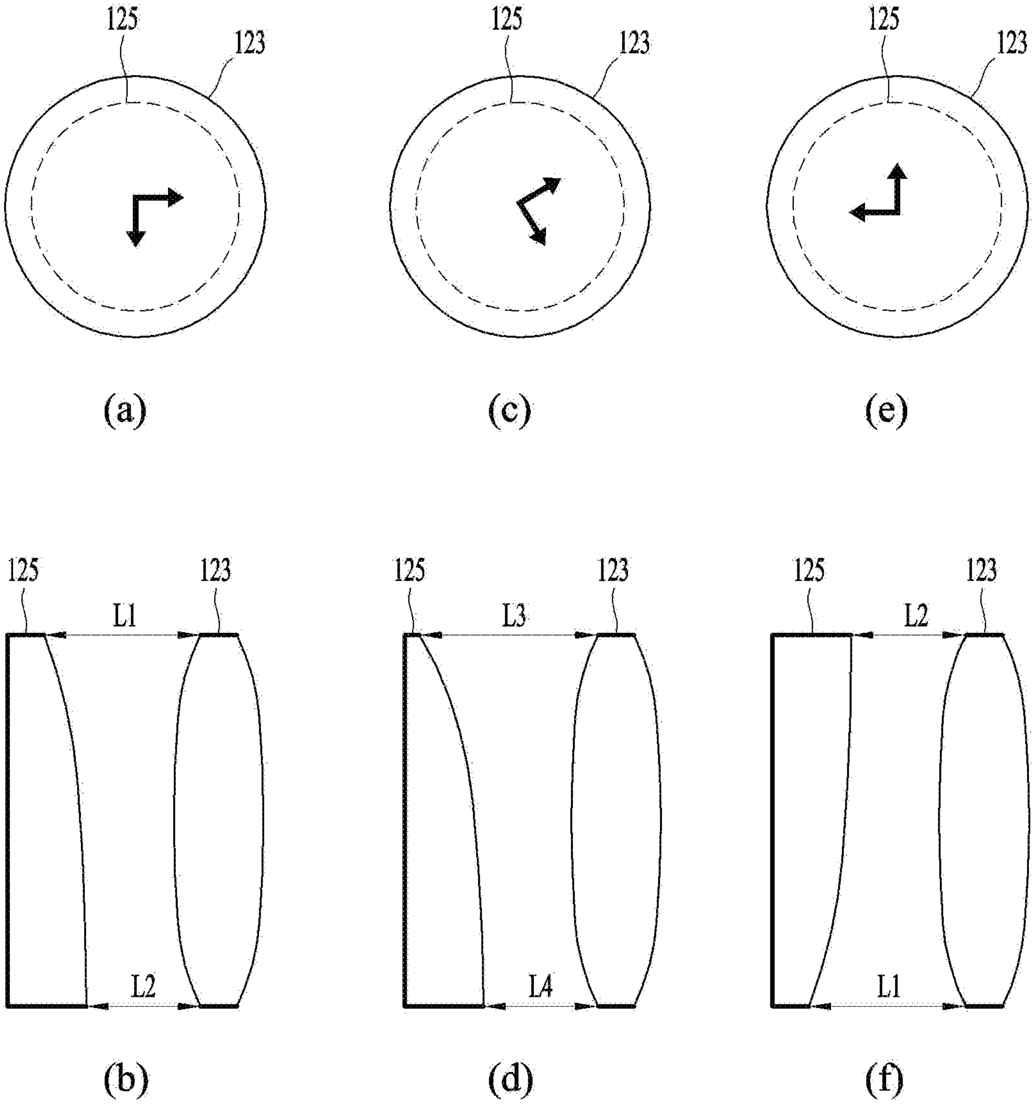
FIG. 10A is a set of views illustrating a structure in which a distance between the optical element and a second lens changes according to a rotational angle of the optical element.
Figure 10B:
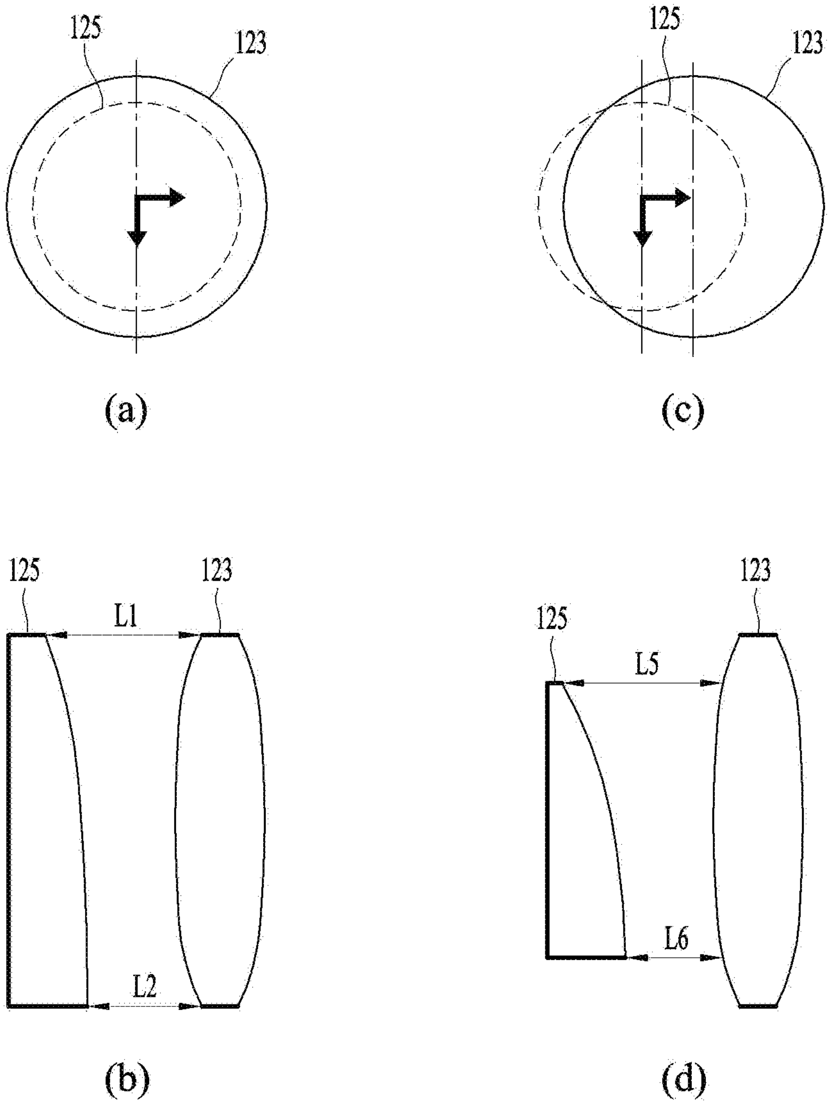
FIG. 10B is a set of views illustrating a structure in which the distance between the optical element and the second lens adjacent to the optical element changes with the movement of the optical element along a specific axial direction.

In the electronic device according to the present disclosure that encrypts an image, the rotation or transition of the optical element changes a distance between the optical element and the second lens adjacent to the optical lens, thereby enabling a change in the encryption format. In association with this, FIG. 10A illustrates a structure in which the distance between the optical element and the second lens adjacent to the optical element changes according to a rotational angle of the optical element. FIG. 10B illustrates a structure in which the distance between the optical element and the second lens adjacent to the optical element changes with the movement of the optical element along a specific axial direction.

(a) of FIG. 10A illustrates a structure in which the rotational angle of the optical element 125 is arranged to 0 degrees. When the rotational angle is 0 degrees as in (a) of FIG. 10A, as in (b) of FIG. 10A, the distance between one surface of the optical element 125 and the second lens 123 is reduced from a first distance L1 at a first end of the image capture area to a second distance L2 at a second end thereof along one axial direction. An image may be encrypted by being formed in such a manner that the distance is reduced from the first distance L1 to the second distance L2 along one axial direction. With reference to FIGS. 2 and 10A, the processor 180 of the electronic device 100 may control a format in which the image is encrypted, by controlling the actuator 130.

(c) of FIG. 10A illustrates a structure in which the rotational angle of the optical element 125 is set to a predetermined angle. When the rotational angle, as in (c) of FIG. 10A, ranges from 0 degrees to 90 degrees, as in (d) of FIG. 10A, the distance between one surface of the optical element 125 and the second lens 123 may be changed by the rotational movement of the optical element 125. In association with this, the distance can be changed from a third distance L3 at the first end to a fourth distance L4 at the second end along one axial direction. In association with this, the third distance L3 is different from the first distance L1, and the fourth distance L4 is different from the second distance L2.

The image may be encrypted in the encryption format that varies according to the rotational angle of the optical element 125. For example, as the optical element 125 is rotationally moved by 0 degrees, 90 degrees, or 180 degrees, the optical element 125 may encrypt the image in a first encryption format, a second encryption format, or a third encryption format, respectively. In association with this, in a case where the rotational angle of the optical element 125 is 0 degrees, when the first distance L1 at the first end of the image capture area is reduced to the second distance L2 at the second end thereof along one axial direction, an image may be encrypted in the first encryption format.

In a case where the optical element 125 is rotationally moved by 90 degrees through the actuator 130 in FIG. 2, the first distance L1 at the first end of the image capture area may be reduced to the second distance L2 at the second distance L2 thereof along the other axial direction perpendicular to one axial direction. Accordingly, in the case where the optical element 125 is rotationally moved by 90 degrees, an image may be encrypted in the second encryption format different from the first encryption format.

(e) of FIG. 10A illustrates a structure in which the rotational angle of the optical element 125 is arranged to 180 degrees. When the rotational angle, as in (e) of FIG. 10A, is 180 degrees, as in (f) of FIG. 10A, the distance between one surface of the optical element 125 and the second lens 123 may be changed by the rotational movement of the optical element 125. In a case where the optical element 125 is rotationally moved by 180 degrees through the actuator 130, the distance may be increased from the second distance L2 at the second end of the image capture area to the first distance L1 at the first end thereof along one axial direction. Accordingly, in the case where the optical element 125 is rotationally moved by 180 degrees, the image may be encrypted in the third encryption format different from the first encryption format and the second encryption format.

The electronic device 100 that encrypts image information may further include a memory 170 in which the encryption key and/or the decryption key is stored. The processor 180 may decrypt the encrypted image using the encryption key (or the decryption key). The decryption key may be configured as a key corresponding to the encryption key. The memory 170 may be configured in such a manner that the encryption keys, formed as results of the rotational movements of the optical element 125 by predetermined angles, are stored therein. The encrypted image and the encryption keys may be stored in the memory 170 or a separate server 300.

The electronic device 100 according to the present disclosure that encrypts image information may decrypt the encrypted image on the basis of the encryption key (or the decryption key). The electronic device 100 may decrypt the encrypted image on the basis of the encryption key (or the decryption key) and may display the decrypted image on the display 151.

The second electronic device 200, which is another electronic device, may decrypt the encrypted image on the basis of the encryption key (or the decryption key) and may display the decrypted image on the display 251.

Processors 180 and 280 may determine whether or not the authority to access the encrypted image is retained. The authority to access the encrypted image may be the authority to access or the authority to view the image on the electronic device 100 or 200, depending on a type of application program. When the authority to access the encrypted image is determined to be retained, the processor 180 may acquire from the memory 170 the encryption key corresponding to the angle by which the optical element 125 is rotated. The processor 180 may decrypt the encrypted image on the basis of the acquired encryption key and may display the decrypted image on the display 170 in an identifiable manner.

The processor 180 may encrypt an image on the basis of the changed second encryption key and may decrypt the encrypted image. The processor 180 may encrypt an image using a different encryption key when the encryption key is determined to have been leaked by an external terminal or depending on the type of application. In association with this, the processor 180 may encrypt an image by rotationally moving the optical element 125 by a different angle when the encryption key is determined to have been leaked or depending on the type of application.

After the optical element 125 is rotationally moved by the different angle, the processor 180 may redetermine whether or not the authority to access the encrypted image is retained. When the authority to access the encrypted image is determined to be retained, the processor 180 may acquire from the memory 170 the second encryption key (or a second decryption key) corresponding to the different angle. The processor 180 may decrypt the encrypted image on the basis of the acquired second encryption key and may display the decrypted image on the display 170 in an identifiable manner.

According to another embodiment, the encryption formation may be changed by moving the optical element 125 along one axial direction or the other axial direction. In association with this, the processor 180 may control the format in which the image is encrypted, by controlling the actuator 130. (a) of FIG. 10B illustrates a structure in which the center of the optical element 125 and the center of the second lens adjacent to the optical element 125 are the same. In a structure in (a) of FIG. 10B, as in (b) of FIG. 10B, the distance between one surface of the optical element 125 and the second lens 123 is reduced from the first distance L1 at the first end of the image capture area to the second distance L2 at the second end thereof along one axial direction. (c) of FIG. 10B illustrates a structure in which the center of the optical element 125 is moved by a predetermined distance along the other axial direction from the center of the second lens 123 adjacent to the optical element 125. The movement of the center of the optical element 125 may reduce an area where optical encryption is performed.

The processor 180 may control the format in which the image is encrypted, by moving the optical element 125 along the other axial direction through the actuator 130. With reference to (d) of FIG. 10B, the distance between one surface of the optical element 125 and the second lens 123 is reduced, by moving the optical element 125 along the other axial direction, from a fifth distance L5 at the first end of the image capture area to a sixth distance L6 at the second end thereof along one axial direction. The fifth distance L5 may be different from the first distance L1, and the sixth distance L6 may be different from the second distance L2. In a structure where the center of the optical element 125 is the same as the center of the camera module 120, the distance between one surface of the optical element 125 and the second lens 123 is formed as the first distance L1 at the first end of the image capture area and the second distance L2 at the second end thereof.

The electronic device 100 according to the present disclosure that encrypts image information determines on the basis of the type of application program whether or not encryption is performed, and when encryption is necessary, moves the optical element 125 into the image capture area. In association with this, on the basis of the type of application program that was executed or is being executed, the processor 180 may determine whether or not the image needs to be encrypted.

When the image is determined not to need to be encrypted, the processor 180 may move the optical element 125 out of the image capture area through the actuator 130. The processor 180 may perform control in such a manner that the image is not encrypted, by moving the optical element 125 out of the image capture area along the other axial direction. When the image is determined to need to be encrypted, the processor 180 may move the optical element 125 into the image capture area through the actuator 130. The processor 180 may perform control in such a manner that the image is encrypted, by moving the optical element 125 into the image capture area along the other axial direction.

The electronic device 100 according to the present disclosure that encrypts image information may improve security through hardware-based encryption that uses the optical element 125, and through software-based encryption that uses a separate encryption key. Specifically, an optically encrypted image has the possibility of being hacked and being image-restored using only deep learning, thereby highlighting the need to maximize security robustness. In association with this, it is possible to diversify encryption by deforming (for example, rotating or shifting) an encryption element in such a manner as to have the PSF that differs among camera modules.

Figure 11:
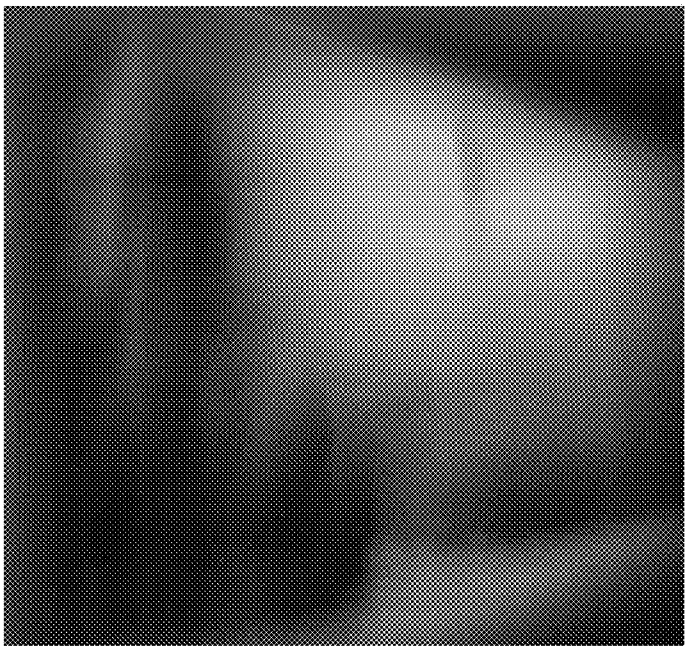
FIG. 11 is a set of views illustrating an optically encrypted image captured by the camera module, which includes the optical element, and an image to which software-based encryption further applies.
Figure 11:
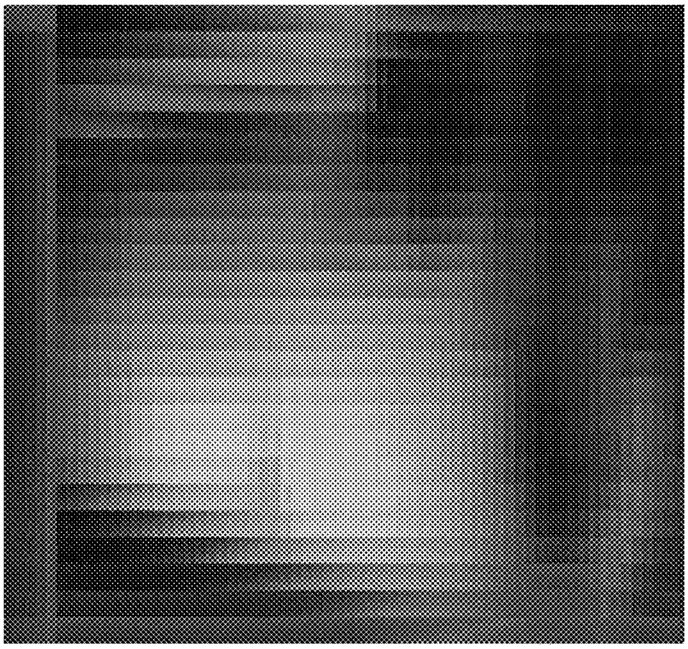

The software-based encryption may apply additionally that makes it impossible to distinguish among camera modules that have the same type of encryption element. Software encryption, which depends on a camera serial number, may apply to the encryptedly captured image. Accordingly, a customer or a user may receive only a software-encrypted image through the camera output. The deformed encryption element, which has the PSF which differs among the camera modules, may be employed, and the software encryption, which depends on the camera serial number, may further apply. In association with this, FIG. 11 illustrates the optically encrypted image captured by the camera module, which includes the optical element, and an image to which the software-based encryption further applies. FIG. 11A illustrates the optically encrypted image captured by the camera module, which includes the optical element. FIG. 11B illustrates an image that results from further applying the software-based encryption to the optically encrypted image. As in FIG. 11B, the image that, as in FIG. 11A, is optically encrypted by the optical element, may be further divided to predetermined tile heights and tile widths and be displayed.

As an example of a software encryption method, the encrypted image may be divided into tiles with heights and widths according to the camera serial number. In addition, a tile encryption technique may be determined according to the camera serial number. For example, in a case where the camera serial number is configured like x2345, the tile height may be determined to be 2 and the tile width to be 3. The tile encryption technique may be determined by x, which precedes the tile height.

In association with the software-based encryption, with reference to FIGS. 2 and 3, the processor 180 may further encrypt the image, encrypted by the optical element 125, using software on the basis of an encryption code. The processor 180 may further the image, which is encrypted by the optical element 125, using software on the basis of the encryption code that differs according to the rotational angle of the optical element 125. Therefore, even if the software-based encryption code is leaked, the security can be improved using the encryption code that differs with the rotational angle of the optical element 125.

A technique of restoring the optically encrypted image in the electronic device according to the present disclosure that encrypts or decrypts image information is described. In association with this, FIG. 12 is a flowchart according to the present disclosure for a process of decrypting the optically encrypted image.

Figure 12:
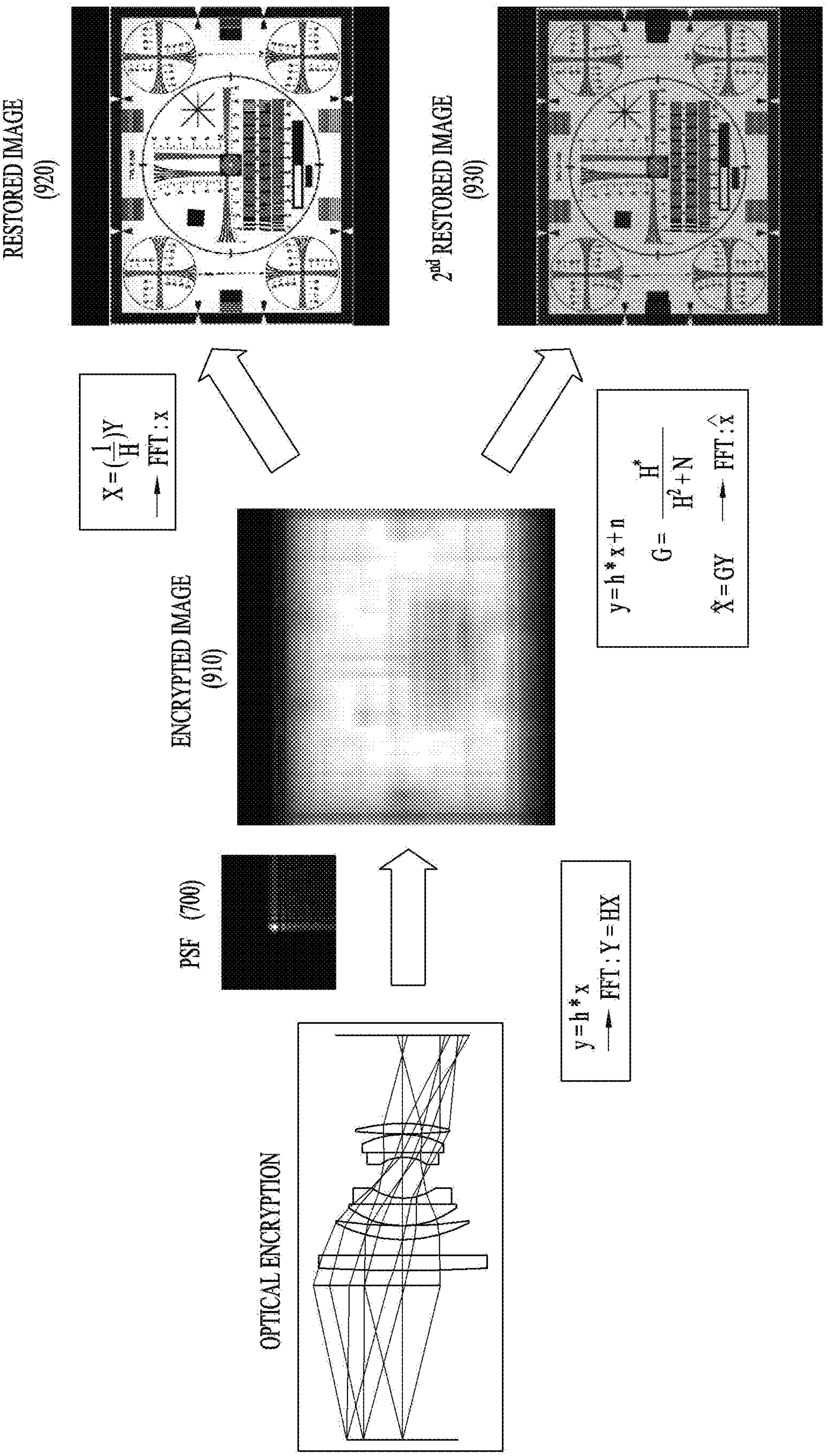
FIG. 12 is a flowchart according to the present disclosure for a process of decrypting the optically encrypted image.

With reference to FIGS. 3 and 12, the encrypted image may be restored by a PSF Wiener image restoration technique. Specifically, the optical encryption may be performed by the camera module 120 including the optical element 125, and a decrypted image 920 may be acquired using a PSF 700 and an encrypted image 910.

In association with this, the PSF image 700 may be acquired by image-capturing a point light source. Restoration to an original image x may be achieved by performing deconvolution on an encrypted image y and a PSF image h. In association with this, the expression y=h*x may be established and "*" depicts convolution computation. The expression Y=HX may be established using FFT, and restoration to the original image X may be achieved by applying inverse PSF computation on a float value of data on the encrypted image. Therefore, the expression X=(1/H)Y may be established.

Data loss may occur because the data on the encrypted image is converted from a float type to an integer type during transmission, storage, and compression processes. Therefore, during the conversion-to-an-integer process after float computation, information loss and FFT deconvolution in a frequency domain assume periodic repetition of an image signal. However, the encrypted image is one signal, and therefore, an error may occur.

In addition, due to the spread characteristic of the PSF image, considering problems such as image border information loss, restoration may be achieved using a Wiener filter. Accordingly, in actual application, an artifact and detail loss may occur in a second decrypted image 930. In association with this, the expression y=h*x+n may be established, "*" depicts convolution computation, and n depicts unknown noise. Accordingly, in actual application, the expression X=GY and the expression $G=H^*/(H^2+N)$ may be established in a frequency domain of the second decrypted image 930 using a transfer function G of the Wiener filter. x, which is the second decrypted image 930, may be acquired by performing IFFT on X.

In actual application, the quality of the second decrypted image 930 decreases. Thus, when webcam functions, such as video chatting and remote monitoring, is used, there may also be a limitation to marketability. However, when the second decrypted image 930 is acquired using a deep learning function, the decrease in quality seldom has an impact.

Therefore, the electronic device according to the present disclosure that encrypts or decrypts image information may perform the quality of the image resulting from the restoration, through deep learning. In association with this, FIG. 13A illustrates the encrypted image, and FIG. 13B illustrates the images resulting from the restoration according to various techniques.

Figure 13A:
FIG. 13A is a set of views illustrating an encrypted image.
Figure 13B:
FIG. 13B is a set of views illustrating images resulting from restoration according to various techniques.

(a) of FIG. 13A illustrates the optically encrypted image that is captured by the camera module including the optical element. (b) of FIG. 13B illustrates a first image 920*a* resulting from the restoration based on a PSF Wiener filter, (a) of FIG. 13B illustrates a second image 920*b* resulting from the restoration with improved image quality through deep learning. (b) of FIG. 13B illustrates a third image 920*c*, which results from direct restoration by performing deep learning on the encrypted image without applying the PSF Wiener filter.

With reference to FIG. 12 and (b) of FIG. 13A, the first image 920*a* may be acquired through IFFT after obtaining X=(1/H)Y using a transfer function H of the PSF Wiener filter h. Because an error and similar issues are not reflected during the transmission, storage, and compression processes of the encrypted image, the first image 920*a* is not completely restored to the original image, and blurring at a predetermined level or higher occurs. Accordingly, the quality of the first image 920*a* decreases, and, depending on the situation, an object within the first image 920*a* may not be accurately identified.

To improve the quality of the image resulting from the restoration based on the PSF Wiener filter, the PSF Wiener image and the original image may be configured as learning data, and additional deep learning may be performed. The second image 920*b* as in (a) FIG. 13B, which is an image resulting from the restoration with improved image quality by applying the trained deep learning model to the PSF Wiener image, may be acquired.

Figure 14:
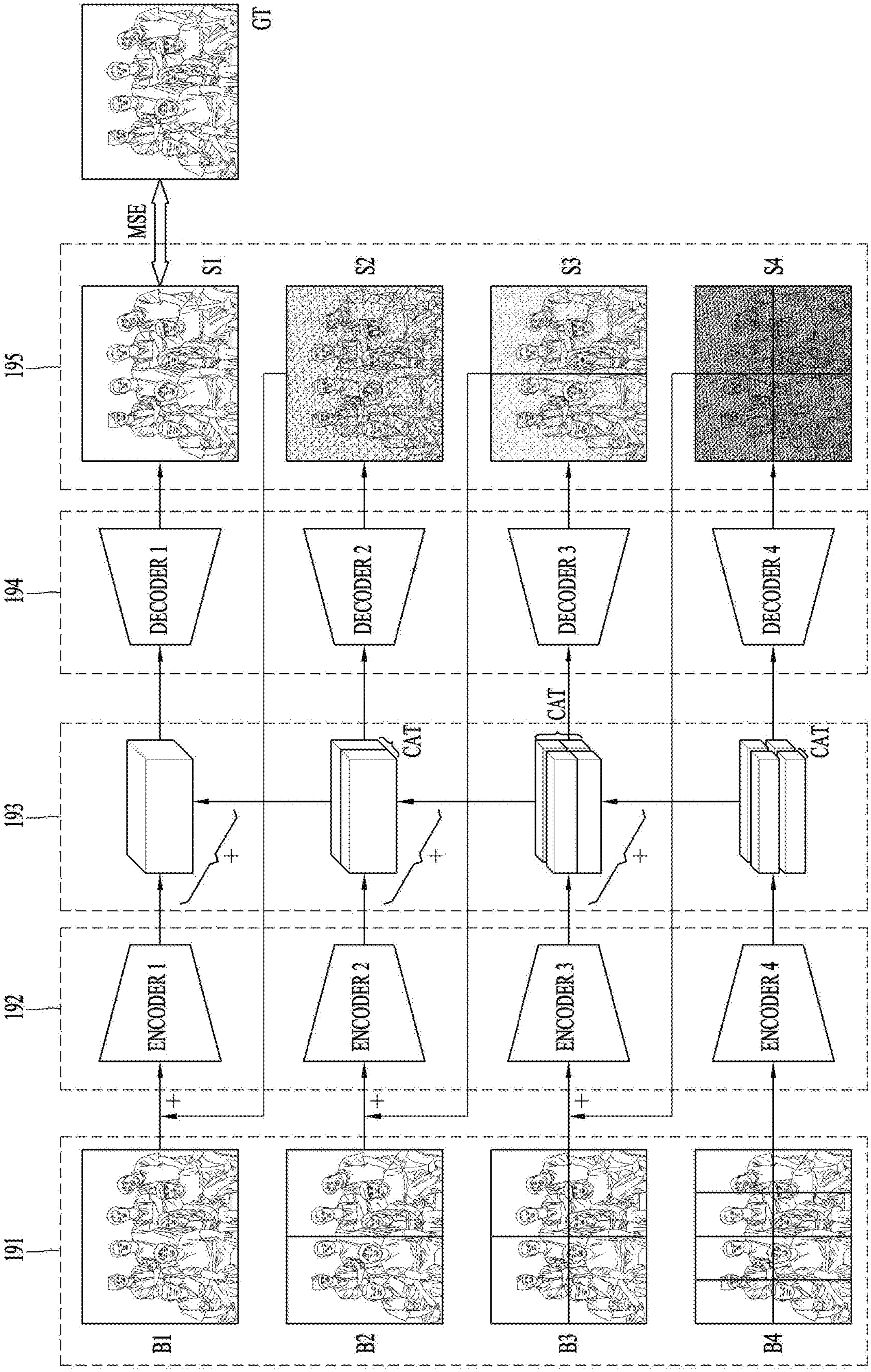
FIG. 14 is a view illustrating a configuration for acquiring an image resulting from decryption using a deep learning model in the electronic device according to the present disclosure that encrypts and decrypts an image.

In association with this, FIG. 14 illustrates a configuration for acquiring an image resulting from decryption using the deep learning model in the electronic device according to the present disclosure that encrypts and decrypts an image. With reference to FIGS. 7A and 14, the image processing unit 190 may be configured to include an input interface 191, a plurality of encoders 192, a deep learning module 193, a plurality of decoders 194, and an output interface 195.

The input interface 191 is configured in such a manner that a plurality of images B1 to B4 are input thereinto. The plurality of images B1 to B4 may be images that are configured in a blurred manner, Among the plurality of images, the first image B1 may be an undivided image, and the second image B2 may be a divided image that is configured with 2 image patches on a per-row basis. Among the plurality of images, the third image B3 may be a divided image that is configured with 4 image patches, arranged in two rows and two columns. Among the plurality of images, the fourth image B4 may be a divided image that is configured with 8 image patches, arranged in two rows and four columns.

The plurality of encoders 19 receive first to fourth images B1 to B4 through Encoders 1 to 4, respectively, and transfer the encoded images to the deep learning modules 193, respectively. Encoder 1 encodes the first image B1 with a residual map S2 at Level 2. Encoder 2 encodes the second image B2 with a residual map S3 at Level 3. Encoder 3 encodes the third image B3 with a residual map S4 at Level 4.

The plurality of decoders 194 may include Decoders 1 to 4. Decoder 1 may output through the output interface 195 an image S1 from the restoration, which is no longer in an encrypted state. The image S1 resulting from the restoration may be a final deblurred image at Level 1. Decoders 2 to 4 may output the residual maps S2 to S4 at Levels 2 to 4, respectively.

The deep learning module 193 may be configured to include first to fourth deep learning units. The first to fourth deep learning units may receive outputs from Encoders 1 to 4 and may transfer learned output results as inputs to Decoders 1 to 4, respectively. A parameter acquired in the fourth deep learning unit may be transferred to the third deep learning unit. A parameter acquired in the third deep learning unit may be transferred to the second deep learning unit. A parameter acquired in the second deep learning unit may be transferred to the first deep learning unit.

Errors among the images may be analyzed by comparing the image S1 resulting from the restoration and the original image. As an example, a mean square error (MSE) may be analyzed by comparing the image S1 from the restoration and a ground-truth sharp image GT.

Next, direct restoration to the original image is possible by performing deep learning on the encrypted image without applying the PSF Wiener filter. The encrypted image, which is captured through the camera module, and the original image are configured as learning data, thereby enabling deep learning. The second image 920*b* as in (a) FIG. 12B, which is an image resulting from the restoration by directly applying the trained deep learning model to the encrypted image, may be acquired. There occurs no meaningful difference between the technique in which the image resulting from the restoration is acquired by directly applying the trained deep learning model to the encrypted image and the technique in that the PSF Wiener image and the original image are configured as learning data and additional deep learning is performed. Therefore, the third image 920*c*, as in (b) of FIG. 12B, may also be acquired by directly restoring the encrypted image using the deep learning model without PSF information.

The electronic device 100 or 200 according to the present disclosure that encrypts or decrypts image information may acquire the encrypted image and/or the encryption key (or the decryption key) through the communication unit 110 or 210, respectively. The communication units 110 and 210 may be configured to receive the captured image, which is encrypted in an unidentifiable manner on the basis of the encryption key, from a transmission device.

In a case where the authority to access the encrypted image is retained, the processor 180 may perform restoration to the second image on the basis of the encryption key, in which the optical element 125 is arranged to an angle of 0 degrees, or the second encryption key, which depends on the rotational angle of the optical element 125. In addition, the processor 180 may perform decryption against the hardware-based encryption and then may perform decryption against the software-based encryption. In association with this, the processor 180 may restore the second image to the normal image by further performing restoration using software on the basis of a decryption code or a second decryption code. The decryption code corresponds to a software-based encryption code in a structure in which the optical element 125 is arranged to an angle of 0 degrees. The second decryption code corresponds to a software-based second encryption code in a structure in which the optical element 125 is rotationally moved by a predetermined angle.

With reference to FIGS. 1 to 14, the electronic device according to the present disclosure that encrypts image information is described below.

The electronic device 100 may be configured to include the camera module 120 and the optical element 124. The camera module 120 may include at least one lens from the lens 121 to 123. The optical element 125 may be coupled in a manner that is movable in the area in front of at least one lens from the lenses 121 to 123, so that an object within an image is encrypted in an unidentifiable manner. At this point, the structure that enables "movably coupled" may be a structure in which the optical element 125 is coupled in the area in front of at least one lens from the lenses 121 to 123 in a manner that is rotatable on a per-predetermined angle basis. In addition, the structure that enables "movably coupled" may be a structure in which the optical element 125 moves in the area in front of at least one lens from the lenses 121 to 123 along one axial direction, for example, the x-axis direction.

The camera module 120 according to the present disclosure may be configured to include the plurality of lenses 121 to 123, the image sensor 124, and the optical element 125. The image sensor 124 may be arranged to be separated from the first lens 121, which is positioned rearmost among the plurality of lenses 121 to 123. The image sensor 124 may be configured to convert an analog signal, associated with the image acquired through the plurality of lenses 121 to 123, into a digital signal.

The optical element 125 may be arranged in front of the second lens 123 arranged frontmost among the plurality of lenses 121 to 123. The optical element 125 may be arranged in the exposure area of the iris, which adjusts an image capture area in such a manner as to adjust the amount of light to be introduced into the plurality of lenses 121 to 123.

The electronic device according to the present disclosure that encrypts image information may encrypt an image in different techniques by rotating the optical element 125 arranged in the area in front of the lenses 121 to 123 or moving the optical element 125 along one axial direction. In association with this, the electronic device 100 may further include the actuator 130 that moves the optical element 125 relative to the lenses 121 and 123.

The actuator 130 rotationally moves the optical element 125 by a predetermined angle, thereby changing a format in which the image is encrypted. As an example, the actuator 130 may control the optical element 125 in such a manner as to encrypt the image, by rotationally moving the optical element 125 by 30 degrees or 45 degrees. The actuator 130 may control the optical element 125 in such a manner as to encrypt the image, by 15 degrees, 30 degrees, 45 degrees, 60 degrees, 90 degrees, or 120 degrees.

With reference to FIGS. 4, 10, and 11A, the actuator 130 may control the optical element 125 to be arranged into or out of the image capture area. Accordingly, the actuator 130 may arrange the optical element 125 into the image capture area, thereby enabling an image to be encrypted. In addition, the actuator 130 may move the optical element 125 out of the image capture area, thereby enabling an image to be captured without going through encryption.

One surface of the optical element 125 that faces the second lens 123, among the plurality of lenses 121 to 123, may be formed in the shape of a parabola along one axial direction and the other axial direction perpendicular to the one axial direction. In association with this, the optical element 125 may be formed in the shape of a parabola in such a manner that the height z thereof satisfies $z=\alpha x^3+\beta y^3$, but is not limited to this shape. The optical element 125 may be formed in the shape of a parabola in such a manner that the height z thereof satisfies $z=\alpha x^{2n+1}+\beta^{y2n+1}$ where n may be an integer that is equal to or greater than 1, resulting in odd powers.

An image may be encrypted by being formed in such a manner that the distance between one surface of the optical element 125 and the second lens 123 is reduced from the first distance L1 at the first end of the image capture area to the second distance L2 at the second end thereof along one axial direction. The processor 180 of the electronic device 100 may control a format in which the image is encrypted, by controlling the actuator 130.

The distance between one surface of the optical element 125 and the second lens 123 may be formed to be changed, by the rotational movement, from the third distance L3 at the first end of the image capture area to the fourth distance L4 at the second end thereof along one axial direction. In association with this, the third distance L3 is different from the first distance L1, and the fourth distance L4 is different from the second distance L2.

An image may be encrypted in the encryption format that varies according to the rotational angle of the optical element 125. For example, when the optical element 125 is rotationally moved by 0 degrees, 90 degrees, or 180 degrees, an image may be encrypted in the first encryption format, the second encryption format, or the third encryption format, respectively. In association with this, in a case where the rotational angle of the optical element 125 is 0 degrees, an image may be encrypted in the first encryption format when the distance between one surface of the optical element 125 and the second lens 123 is reduced from the first distance L1 at the first end of the image capture area to the second distance L2 at the second end thereof along one axial direction.

In a case where through the actuator 130, the optical element 125 is rotationally moved by 90 degrees, the distance may be reduced from the first distance L1 at the first end of the image capture area to the second distance L2 at the second end thereof along the other axial direction perpendicular to one axial direction. Accordingly, in the case where the optical element 125 is rotationally moved by 90 degrees, an image may be encrypted in the second encryption format different from the first encryption format. In the case where the optical element 125 is rotationally moved by 180 degrees through the actuator 130, the distance may be increased from the second distance L2 at the second end of the image capture area to the first distance L1 at the first end thereof along one axial direction. Accordingly, in the case where the optical element 125 is rotationally moved by 180 degrees, an image may be encrypted in the third encryption format different from the first encryption format and the second encryption format.

The electronic device 100 that encrypts image information may further include the memory 170 in which the encryption key and/or the decryption key is stored. The processor 180 may decrypt the encrypted image using the encryption key (or the decryption key). The decryption key may be configured as a key corresponding to the encryption key. The memory 170 may be configured in such a manner that the encryption keys, formed as results of the rotational movements of the optical element 125 by predetermined angles, are stored therein. The encrypted image and the encryption keys may be stored in the memory 170 or a separate server 300.

The electronic device 100 according to the present disclosure that encrypts image information may decrypt the encrypted image on the basis of the encryption key (or the decryption key). The electronic device 100 may decrypt the encrypted image on the basis of the encryption key (or the decryption key) and may display the decrypted image on the display 151.

The second electronic device 200, which is another electronic device, may decrypt the encrypted image on the basis of the encryption key (or the decryption key) and may display the decrypted image on the display 251.

Processors 180 and 280 may determine whether or not the authority to access the encrypted image is retained. The authority to access the encrypted image may be the authority to access or the authority to view the image on the electronic device 100 or 200, depending on the type of application program. When the authority to access the encrypted image is determined to be retained, the processor 180 may acquire from the memory 170 the encryption key corresponding to the angle by which the optical element 125 is rotated. The processor 180 may decrypt the encrypted image on the basis of the acquired encryption key and may display the decrypted image on the display 170 in an identifiable manner.

The processor 180 may encrypt an image on the basis of the changed second encryption key and may decrypt the encrypted image. The processor 180 may encrypt an image using a different encryption key when the encryption key is determined to have been leaked by an external terminal or depending on the type of application. In association with this, the processor 180 may encrypt an image by rotationally moving the optical element 125 by a different angle when the encryption key is determined to have been leaked or depending on the type of application.

After the optical element 125 is rotationally moved by a different angle, the processor 180 may redetermine whether the authority to access the encrypted image is retained. When the authority to access the encrypted image is determined to be retained, the processor 180 may acquire from the memory 170 the second encryption key (or the second decryption key) corresponding to the different angle. The processor 180 may decrypt the encrypted image on the basis of the acquired second encryption key and may display the decrypted image on the display 170 in an identifiable manner.

According to another embodiment, the encryption formation may be changed by moving the optical element 125 along one axial direction or the other axial direction. In association with this, the processor 180 may control the format in which the image is encrypted, by controlling the actuator 130.

The processor 180 may control the format in which the image is encrypted, by moving the optical element 125 along the other axial direction through the actuator 130. The distance between one surface of the optical element 125 and the second lens 123 may be formed to be changed, by the rotational movement, from the fifth distance L5 at the first end of the image capture area to the sixth distance L6 at the second end thereof along the other axial direction. The fifth distance L5 may be different from the first distance L1, and the sixth distance L6 may be different from the second distance L2. In the structure where the center of the optical element 125 is the same as the center of the camera module 120, the distance between one surface of the optical element 125 and the second lens 123 is formed as the first distance L1 at the first end of the image capture area and the second distance L2 at the second end thereof.

The electronic device 100 according to the present disclosure that encrypts image information determines on the basis of the type of application program whether or not encryption is performed, and when encryption is necessary, moves the optical element 125 into the image capture area. In association with this, on the basis of the type of application program that is already executed or is being executed, the processor 180 may determine whether or not the image needs to be encrypted.

When the image is determined not to need to be encrypted, the processor 180 may move the optical element 125 out of the image capture area through the actuator 130. The processor 180 may perform control in such a manner that the image is not encrypted, by moving the optical element 125 out of the image capture area along the other axial direction. When the image is determined to need to be encrypted, the processor 180 may move the optical element 125 into the image capture area through the actuator 130. The processor 180 may perform control in such a manner that the image is encrypted, by moving the optical element 125 into the image capture area along the other axial direction.

The electronic device 100 according to the present disclosure that encrypts image information may improve the security through hardware-technique encryption that uses the optical element 125, and through software-technique encryption that uses a separate encryption key. In association with this, the processor 180 may further encrypt the image, which is encrypted by the optical element 125, using software on the basis of the encryption code. The processor 180 may further the image, which is encrypted by the optical element 125, using software on the basis of the encryption code that differs according to the rotational angle of the optical element 125. Therefore, even if the software-technique encryption code is leaked, the security can be improved using the encryption code that differs with the rotational angle of the optical element 125.

The electronic device 100 or 200 according to the present disclosure that encrypts or decrypts image information may acquire the encrypted image and/or the encryption key (or the decryption key) through the communication unit 110 or 210, respectively. The communication units 110 and 210 may be configured to receive the captured image, which is encrypted in an unidentifiable manner on the basis of the encryption key, from the transmission device.

In a case where the authority to access the encrypted image is retained, the processor 180 may perform restoration to the second image on the basis of the encryption key, in which the optical element 125 is arranged to an angle of 0 degrees, or the second encryption key, which depends on the rotational angle of the optical element 125. In addition, the processor 180 may perform decryption against the hardware-technique encryption and then may perform decryption against the software-technique encryption. In association with this, the processor 180 may restore the second image to the normal image by further performing restoration using software on the basis of the decryption code or the second decryption code. The decryption code corresponds to the software-technique encryption code in the structure in which the optical element 125 is arranged to an angle of 0 degrees. The second decryption code corresponds to the software-technique second encryption code in the structure in which the optical element 125 is rotationally moved by a predetermined angle.

The processor 180 of the electronic device 100 according to the present disclosure which encrypts and decrypts image information may restore the encrypted image in a deep learning technique through the image processing unit 190 and may output the image resulting from the restoration. The image processing unit 190 may be embodied separately from the processor 180 or may be configured to be included in the processor 180.

The image processing unit 190 may select the point spread function (PSF) image associated with the PSF that depends on the rotational angle of the optical element 125. The image processing unit 190 may restore the encrypted image on the basis of the encryption key corresponding to the orientation of the selected PSF image and may output the image resulting from the restoration.

The image processing unit 190 may acquire the image resulting from the restoration without applying the PSF filter. The image processing unit 190 may output the image resulting from the restoration, through deep learning that uses learning data configured as the encrypted image and the original image. The encrypted image is captured through the camera module 120 according to the rotational angle of the optical element 125.

The image processing unit 190 may include an input interface 191 configured to receive a plurality of blurred images B1 to B4. The image processing unit 190 may include the plurality of encoders 192 configured to receive the plurality of images B1 to B4 and output the encoded images. The image processing unit 190 may include the deep learning module 193 configured to include the plurality of deep learning units coupled to the plurality of encoders 192, respectively. The image processing unit 190 may include the plurality of decoders 194 coupled to the plurality of deep learning units, respectively. The image processing unit 190 may perform control in such a manner that the first image B1 not divided, among the plurality of images, is input into Encoder 1, among the plurality of encoders, and that the image resulting from the restoration is output through Decoder 1, among the plurality of decoders.

The second to fourth images B2 to B4, among the plurality of images, may be divided images. Encoder 1, among the plurality of encoders, may encode the first image B1 with a second residual image S2 that has a lower resolution than the image S1 resulting from the restoration. Encoder 2 into which the second image B2 is input may encode the second image B2 with a third residual image S3 that has a lower resolution than the second residual image S2. Encoder 3 into which the third image B3 is input may encode the third image B3 with a fourth residual image S4 that has a lower resolution than the third residual image S3. Through the encoder structure that features this hierarchical structure, the characteristics of an object area that are divided into images may be in detail reflected. Consequently, the image resulting from the restoration, with reduced errors at border areas, may be acquired.

The electronic device and the image transmission and reception system according to the present disclosure which transmit or receive the encrypted image are described above. Technical effects of the electronic device and the image transmission and reception system according to the present disclosure which transmit or receive the encrypted image are described as follows.

The method of encrypting the encrypted image in an unidentifiable manner according to the present disclosure and the electronic device and the image transmission and reception system that perform the method are described as follows.

According to the present disclosure, an image is blurred by switching on and thus adding an optical element, which is a new optical component, to a camera lens. As a result, even if utilized for deep learning and similar applications or if hacked, a personal image can remain unidentifiable.

According to the present disclosure, when a unique function of a camera, such as video chatting or remote monitoring, is needed, an image that has completely the same quality as an image captured by a general camera can be provided by switching off and thus removing the added optical element.

According to the present disclosure, when an image captured by an IoT camera, such as a smart home camera, is hacked or utilized as Big Data for artificial intelligence learning data and similar applications, the image, which is optically processed in an unidentifiable manner at the camera level and thus rendered unidentifiable, is output. Consequently, privacy can be protected fundamentally.

According to the present disclosure, a camera structure and a control method can be provided that are capable of effectively dealing with two situations. One situation is when a normal image is needed for video chatting, remote monitoring, or the like. The other situation is when an image processed in an unidentifiable manner is needed because artificial intelligence operates in a general situation.

According to the present disclosure, an image encryption method can be provided that uses hardware and/or software encryption techniques. This method is capable of dealing with an environment where hacking of IoT devices is also continuously increasing and, if necessary, performing the camera function of a general webcam as well.

According to the present disclosure, not only the risks, such as hacking, but also the causes of breaches of sensitive privacy, which may occur during a data transmission process or a storage process, can be fundamentally eliminated by performing a subsequent deep learning process using optical encryption and an encrypted image.

According to the present disclosure, because a mathematical encryption key for an optically encrypted image is provided, it is also possible that the optically encrypted image is output as an original image, resulting from decryption, in a reception device when necessary.

According to the present disclosure, not only the risks, such as hacking, but also the causes of breaches of sensitive privacy, which may occur during a data transmission process or a storage process, can be fundamentally eliminated by performing a subsequent deep learning process using optical encryption and an encrypted image.

According to the present disclosure, when performing a function such as video chatting or remote monitoring through a switching technique such as the movement or rotation of an encryption optical element, a captured image can be provided in real time with completely the same image quality as an image captured by a general camera, without the burden of additional computation.

Further scope of applicability of the present disclosure will become apparent from the foregoing detailed description. It should be understood, however, that the detailed description and specific examples, such as the preferred embodiment of the invention, are given by way of illustration only, since various changes and modifications within the idea and scope of the invention will be apparent to those skilled in the art.

In relation to the aforementioned present disclosure, design and operations of a plurality of antennas of an antenna system mounted in a vehicle and a configuration performing the control of those antennas can be implemented as computer-readable codes in a program-recorded medium. The computer-readable media may include all kinds of recording apparatuses in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). The computer may include the controller of the terminal. Therefore, it should also be understood that the above-described implementations are not limited by any of the details of the foregoing description, unless otherwise specified, but rather should be construed broadly within its scope as defined in the appended claims, The scope of the invention should be determined by reasonable interpretation of the appended claims and all changes that come within the equivalent scope of the invention are included in the scope of the disclosure.

The invention claimed is:

1. An electronic device that encrypts image information, the electronic device comprising:
  a camera module including at least one lens configured to capture an image; and
  an optical element coupled to be movable in an area in front of the at least one lens in such a manner that an object within the image is encrypted by being optically blurred or defocused to an extent that the object cannot be visually identified,
  wherein one surface of the optical element facing the at least one lens is formed in a shape of a parabola, and
  wherein a distance between the one surface and the at least one lens varies according to a position within an image capture area,
  wherein the camera module comprises:
    a plurality of lenses;
    an image sensor arranged to be separated from a first lens arranged rearmost among the plurality of lenses, and configured to convert an analog signal, associated with the image acquired through the plurality of lenses, into a digital signal; and
    the optical element arranged in front of a second lens arranged frontmost among the plurality of lenses such that the distance between the one surface of the optical element and the at least one lens is the same as a distance between the one surface of the optical element and the second lens, and
  wherein the optical element is arranged in an exposure area of an iris adjusting an image capture area in such a manner as to adjust an amount of light to be introduced into the plurality of lenses.

2. The electronic device of claim 1, further comprising:
  an actuator configured to move the optical element relative to the second lens,
  wherein the actuator rotationally moves the optical element by a predetermined angle, thereby changing a format in which the image is encrypted.

3. The electronic device of claim 2, wherein the distance between the one surface of the optical element and the second lens is reduced from a first distance at a first end of the image capture area to a second distance at a second end thereof, along a first axial direction, thereby encrypting the image.

4. The electronic device of claim 3, further comprising:
  a processor configured to control a format in which the image is encrypted, by controlling the actuator,
  wherein the processor controls the format in which the image is encrypted, by enabling the actuator to rotationally move the optical element by a predetermined angle,
  wherein the distance between the one surface of the optical element and the second lens is formed to be changed, by rotational movement, from a third distance at the first end of the image capture area to a fourth distance at the second end thereof along the first axial direction, and
  wherein the third distance is different from the first distance, and the fourth distance is different from the second distance.

5. The electronic device of claim 4, wherein, when the distance between the one surface of the optical element and the second lens is reduced from the first distance at the first end of the image capture area to the second distance at the second end thereof along the first axial direction, the image is encrypted in a first encryption format,
  wherein, when the optical element is rotationally moved by 90 degrees by the actuator, the distance between the one surface of the optical element and the second lens is changed from a fifth distance at the first end of the image capture area to a sixth distance at the second end thereof along the first axial direction, thereby encrypting the image in a second encryption format, and
  wherein, when the optical element is rotationally moved by 180 degrees by the actuator, the distance between the one surface of the optical element and the second distance at the first end of the image capture area is increased to the first distance at the second end thereof along the first axial direction, thereby encrypting the image in a third encryption format.

6. The electronic device of claim 4, further comprising:
  a memory configured in such a manner that encryption keys formed as results of the rotational movements of the optical element by predetermined angles are stored therein,
  wherein the encrypted image and the encryption keys are stored in the memory or a separate server.

7. The electronic device of claim 6, wherein the processor determines whether an access authority to access the encrypted image is retained, wherein, when the access authority is determined to be retained, the processor acquires from the memory an encryption key corresponding to an angle by which the optical element is rotated, and wherein the processor decrypts the encrypted image on the basis of the encryption key acquired by the processor and displays the decrypted image on a display in an identifiable manner.

8. The electronic device of claim 7, wherein, when the encryption key is determined to have been leaked to an external terminal, or according to a type of an application, the processor encrypts an image by rotationally moving the optical element by a different angle.

9. The electronic device of claim 8, wherein the processor determines whether or not an access authority to access the encrypted image is retained, and, when the access authority is determined to be retained, acquires from the memory a second encryption key corresponding to the different angle, and wherein the processor decrypts the encrypted image on the basis of the second encryption key acquired by the processor and displays the decrypted image on a display in an identifiable manner.

10. The electronic device of claim 9, wherein the processor further encrypts the encrypted image using software on the basis of an encryption code that differs according to the rotational angle of the optical element.

11. The electronic device of claim 10, further comprising:

a communication unit configured to receive from a transmission device an image that results from encrypting a captured image by being optically blurred or defocused to an extent that the object cannot be visually identified on the basis of an encryption key, wherein, in a case where the access authority to access the encrypted image is retained, the processor restores the encrypted image to a second image on the basis of the encryption key or the second encryption key, and further restores the second image to a normal image using software.

12. The electronic device of claim 3, further comprising:

a processor configured to control a format in which the image is encrypted, by controlling the actuator, wherein the processor controls the format in which the image is encrypted, by enabling the actuator to move the optical element along a second axial direction perpendicular to the first axial direction, wherein the distance between one surface of the optical element and the second lens is formed to be changed by the movement along the second axial direction, from a seventh distance at the first end of the image capture area to an eighth distance at the second end thereof, and wherein the seventh distance is different from the first distance, and the eighth distance is different from the second distance.

13. The electronic device of claim 12, wherein the processor determines whether or not the image needs to be encrypted, on the basis of a type of application program that is already executed or is being executed, and wherein, when the image is determined not to require encryption, the processor controls the actuator to move the optical element out of the image capture area along a second axial direction perpendicular to the first axial direction, in such a manner that the image is not encrypted.

14. The electronic device of claim 12, wherein the processor further comprises:

an image processing unit configured to restore the encrypted image in a deep learning technique and to output a restored image.

15. The electronic device of claim 14, wherein the image processing unit selects a point spread function (PSF) image associated with a PSF that depends on the rotational angle of the optical element, restores the encrypted image on the basis of an encryption key corresponding to an orientation of the selected PSF image, and outputs the restored image.

16. The electronic device of claim 14, wherein the image processing unit outputs the restored image, through deep learning that uses learning data configured as the encrypted image and an original image, the encrypted image being captured through the camera module according to the rotational angle of the optical element.

17. The electronic device of claim 14, wherein the image processing unit comprises:

an input interface configured to receive a plurality of blurred images;

a plurality of encoders configured to receive the plurality of blurred images and to output encoded images;

a deep learning module configured to include a plurality of deep learning units coupled to the plurality of encoders, respectively; and a plurality of decoders coupled to the plurality of deep learning units, respectively, wherein the image processing unit performs control in such a manner that a first image, not divided, among the plurality of blurred images, is input into a first encoder, among the plurality of encoders, and that the restored image is output through a first decoder, among the plurality of decoders.

18. The electronic device of claim 17, wherein second to fourth images, among the plurality of blurred images, are divided images, and wherein the first encoder, among the plurality of encoders, encodes the first image with a second residual image having a lower resolution than the restored image, the second encoder into which the second image is input encodes the second image with a third residual image having a lower resolution than the second residual image, and the third encoder into which the third image is input encodes the third image with a fourth residual image having a lower resolution than the third residual image.

19. The electronic device of claim 1, further comprising:

an actuator configured to move the optical element relative to the second lens, wherein the actuator arranges the optical element into the image capture area, thereby encrypting the image, and wherein the actuator moves the optical element out of the image capture area, thereby enabling the image to be captured without going through encryption.

* * * * *